United States Patent
Fujishiro et al.

(10) Patent No.: US 12,389,205 B2
(45) Date of Patent: Aug. 12, 2025

(54) COMMUNICATION CONTROL METHOD AND USER EQUIPMENT

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA CORPORATION, Kyoto (JP)

( * ) Notice: Subject to any disclaimer, the term of this patent is extended or adjusted under 35 U.S.C. 154(b) by 97 days.

(21) Appl. No.: 18/351,349

(22) Filed: Jul. 12, 2023

(65) Prior Publication Data

US 2023/0362595 A1 Nov. 9, 2023

Related U.S. Application Data

(63) Continuation of application No. PCT/JP2022/000641, filed on Jan. 12, 2022.

(60) Provisional application No. 63/136,946, filed on Jan. 13, 2021.

(51) Int. Cl.
*H04W 4/06* (2009.01)
*H04W 76/27* (2018.01)

(52) U.S. Cl.
CPC ............ *H04W 4/06* (2013.01); *H04W 76/27* (2018.02)

(58) Field of Classification Search
CPC ........ H04W 4/06; H04W 76/27; H04W 76/40
See application file for complete search history.

(56) References Cited

U.S. PATENT DOCUMENTS

| | | | |
|---|---|---|---|
| 2011/0216688 A1* | 9/2011 | Katori | H04W 72/30 370/312 |
| 2018/0206080 A1* | 7/2018 | Chen | H04W 76/40 |
| 2023/0337326 A1* | 10/2023 | Estevez | H04W 72/30 |
| 2023/0345310 A1* | 10/2023 | Li | H04W 4/06 |

OTHER PUBLICATIONS

Huawei, HiSilicon "Discussion on multicast support for Idle/Inactive UEs" 3GPP TSG RAN WG1 Meeting #103-e R1-2007564 (Year: 2020).*
3rd Generation Partnership Project; Technical Specification Group Radio Access Network; NR; NR and NG-RAN Overall Description; Stage 2 (Release 16); 3GPP TS 38.300 V16.3.0; Sep. 2020; pp. 1-148.

(Continued)

*Primary Examiner* — Gary Mui
*Assistant Examiner* — Adam Lane Rusterholz
(74) *Attorney, Agent, or Firm* — Studebaker Brackett PLLC

(57) ABSTRACT

A communication control method according to an embodiment is a method used in a mobile communication system for providing a multicast broadcast service (MBS) from a base station to a user equipment. The communication control method includes transmitting, by the base station to the user equipment, switching information for switching a delivery mode between a first mode in which an MBS configuration is provided through dedicated signaling and a second mode in which the MBS configuration is provided through broadcast signaling; and performing, by the user equipment having received the switching information, mode switching between the first mode and the second mode based on the switching information.

3 Claims, 21 Drawing Sheets

(56) References Cited

OTHER PUBLICATIONS

ZTE, Sanechips; "Delivery mode switching for NR MBS"; 3GPP TSG-RAN WG2 Meeting #112 electronic, R2-2009742; Online; Nov. 2-13, 2020; Total 4 pages.
CATT; "Open Issues on Dynamic PTM and PTP Switch"; 3GPP TSG-RAN WG2 Meeting #112 electronic, R2-2008793; Online; Nov. 2-13, 2020; Total 6 pages.

* cited by examiner

|  | Delivery mode 1 (FIRST MODE) | Delivery mode 2 (SECOND MODE) |
|---|---|---|
| Intended for | Multicast sessions (High QoS requirement) | Broadcast sessions (Low QoS requirement) |
| Reception in | Connected | Connected IDLE/INACTIVE |
| Configuration signalling by | RRC Reconfiguration | BCCH (MCCH) |

FIG. 7

COMMUNICATION CONTROL METHOD AND USER EQUIPMENT

RELATED APPLICATIONS

The present application is a continuation based on PCT Application No. PCT/JP2022/000641, filed on Jan. 12, 2022, which claims the benefit of U.S. Provisional Patent Application No. 63/136,946 filed on Jan. 13, 2021. The content of which is incorporated by reference herein in their entirety.

TECHNICAL FIELD

The present disclosure relates to a communication control method and a user equipment used in a mobile communication system.

BACKGROUND OF INVENTION

In recent years, a mobile communication system of the fifth generation (5G) has attracted attention. New Radio (NR), which is a Radio Access Technology (RAT) of the 5G System, has features such as high speed, large capacity, high reliability, and low latency compared to Long Term Evolution (LTE), which is a fourth-generation radio access technology.

CITATION LIST

Non-Patent Literature

Non-Patent Document 1: 3GPP Technical Specification "3GPP TS 38.300 V 16.3.0 (2020-09)"

SUMMARY

A communication control method according to a first aspect is a method used in a mobile communication system for providing a multicast broadcast service (MBS) from a base station to a user equipment. The communication control method includes transmitting, by the base station to the user equipment, switching information that switches a delivery mode between a first mode where an MBS configuration is provided through dedicated signaling and a second mode where the MBS configuration is provided through broadcast signaling, and performing, by the user equipment having received the switching information, mode switching between the first mode and the second mode based on the switching information.

A user equipment according to a second aspect is an apparatus used in a mobile communication system for providing a multicast broadcast service (MBS). The user equipment includes a receiver that receives, from a base station, switching information that switches a delivery mode between a first mode where an MBS configuration is provided through dedicated signaling and a second mode where the MBS configuration is provided through broadcast signaling; and a controller that performs mode switching between the first mode and the second mode based on the switching information.

BRIEF DESCRIPTION OF THE DRAWINGS

FIG. 7 is a diagram illustrating delivery modes according to an embodiment.

DESCRIPTION OF EMBODIMENTS

Introduction of multicast broadcast services to the 5G system (NR) has been under study. NR multicast broadcast services are desired to provide enhanced services compared to LTE multicast broadcast services.

The present disclosure provides an improved multicast broadcast service.

A mobile communication system according to an embodiment is described with reference to the drawings. In the description of the drawings, the same or similar parts are denoted by the same or similar reference signs.

Configuration of Mobile Communication System First, a configuration of a mobile communication system according to an embodiment is described.

Figure 1:
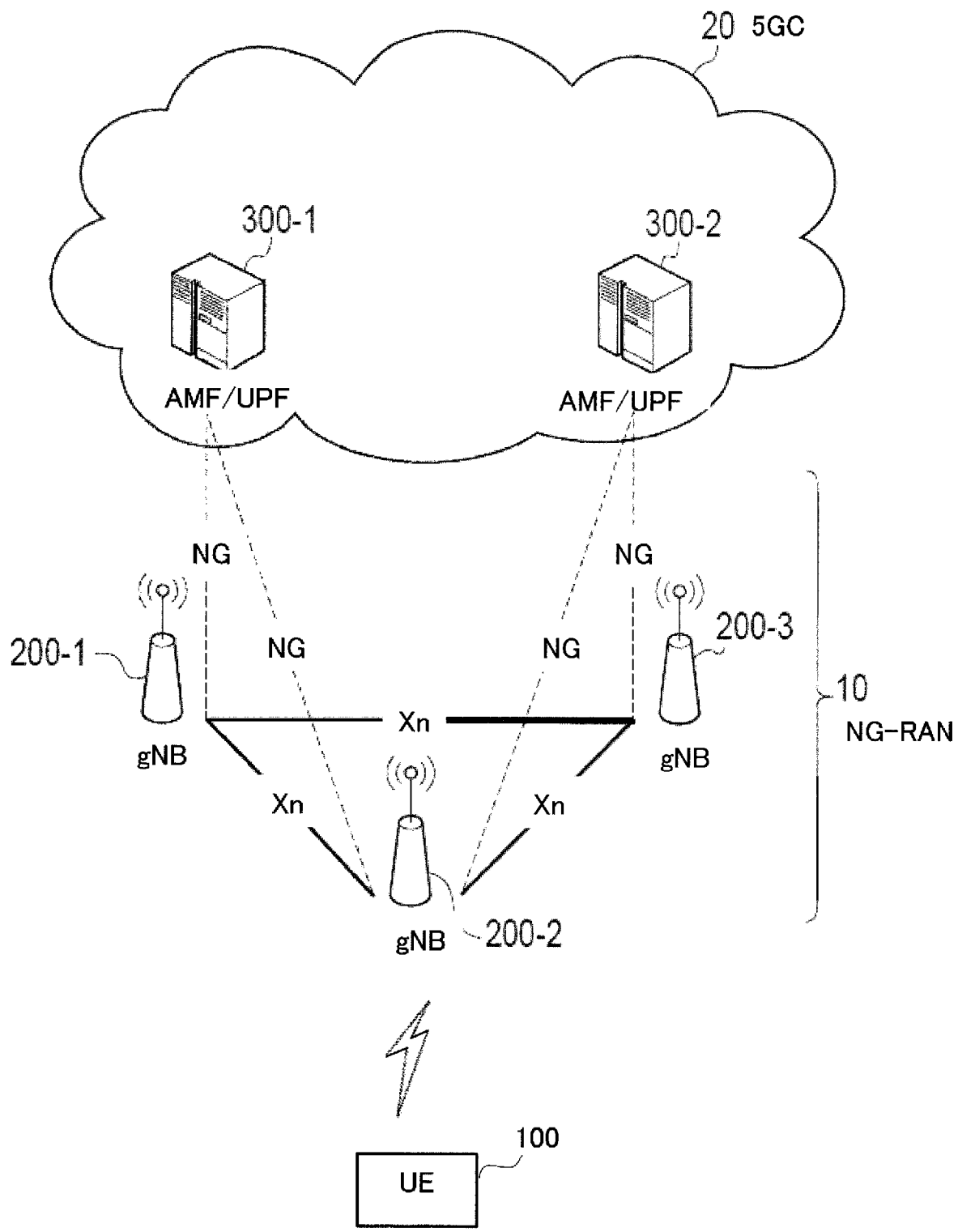
FIG. 1 is a diagram illustrating a configuration of a mobile communication system according to an embodiment.

FIG. 1 is a diagram illustrating a configuration of the mobile communication system according to an embodiment. This mobile communication system complies with the 5th Generation System (5GS) of the 3GPP standard. The description below takes the 5GS as an example, but the Long Term Evolution (LTE) system and/or the 6th generation (6G) system may be at least partially applied to the mobile communication system.

As illustrated in FIG. 1, the mobile communication system includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the UE 100 is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and/or the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
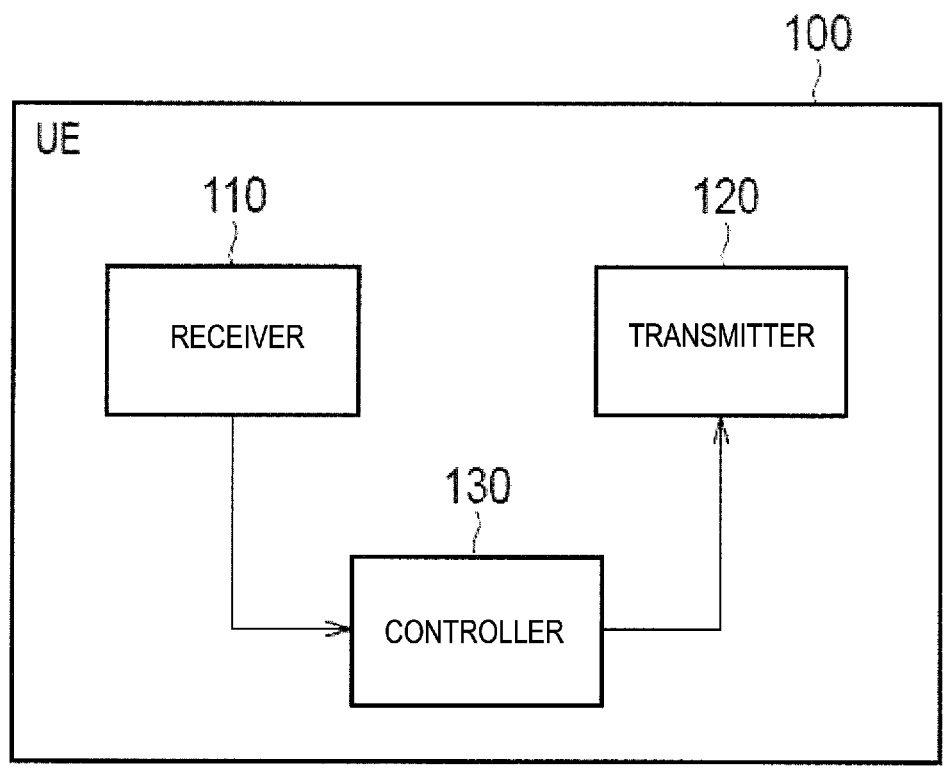
FIG. 2 is a diagram illustrating a configuration of a user equipment (UE) according to an embodiment.

FIG. 2 is a diagram illustrating a configuration of the user equipment (UE) 100 according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
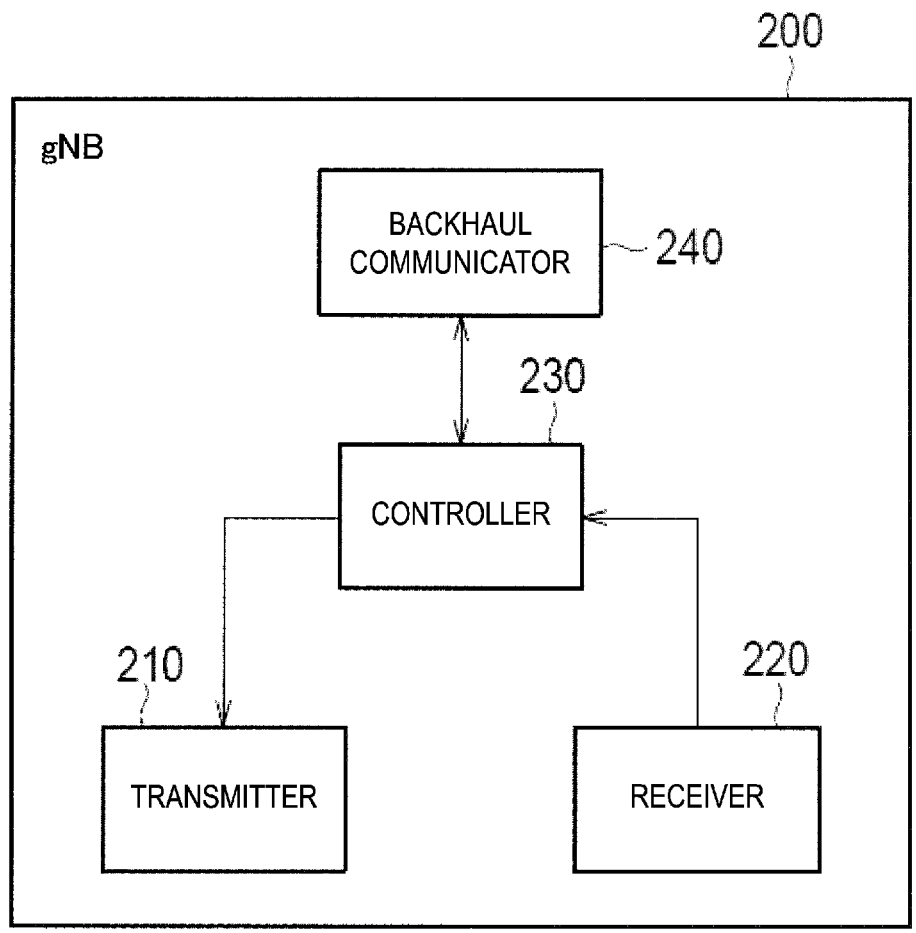
FIG. 3 is a diagram illustrating a configuration of a base station (gNB) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
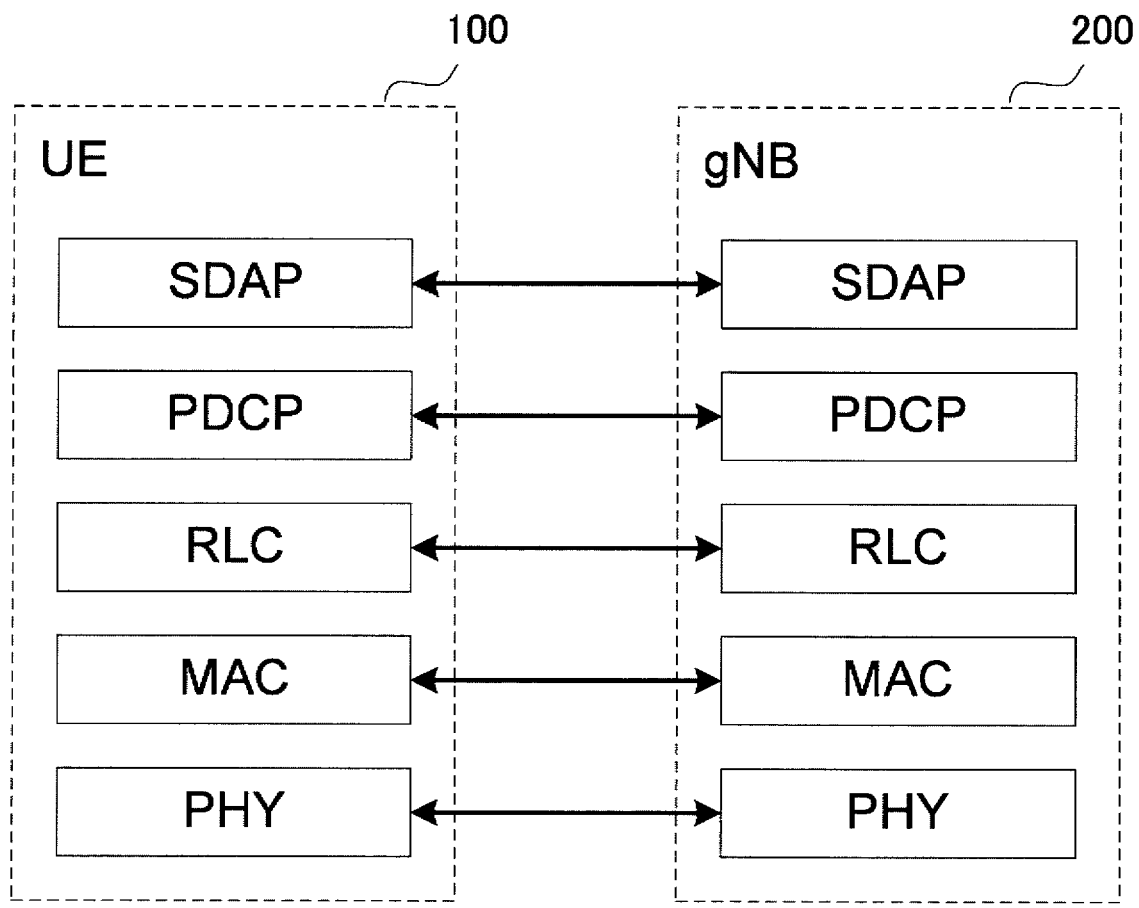
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink, and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

Figure 5:
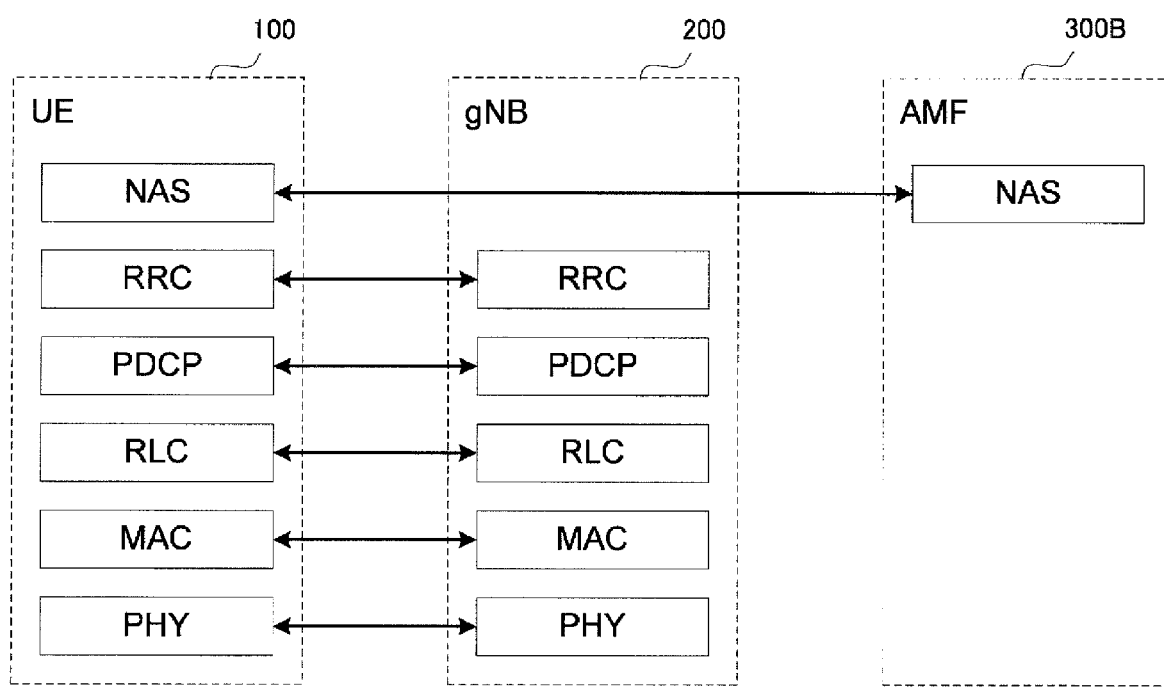
FIG. 5 is a diagram illustrating a configuration of a protocol stack of a radio interface of a control plane handling signaling (control signal).

FIG. 5 is a diagram illustrating a configuration of a protocol stack of a radio interface of a control plane handling signaling (a control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is positioned higher than the RRC layer performs session management, mobility management, and the like. NAS signaling is transmitted between the NAS layer of the UE 100 and the NAS layer of an AMF 300B.

Note that the UE 100 includes an application layer other than the protocol of the radio interface.

MBS

An MBS according to an embodiment is described.

The MBS is a service in which the NG-RAN 10 can provide broadcast or multicast, i.e., Point To Multipoint (PTM) data transmission to the UE 100. Note that assumed use cases (service types) of the MBS include public safety communication, mission critical communication, Vehicle to Everything (V2X) communication, IPv4 or IPv6 multicast delivery, IPTV, group communication, and software delivery.

A broadcast service provides a service to every UE 100 within a particular service area for an application not requiring highly reliable QoS. An MBS session used for the broadcast service is referred to as a broadcast session.

A multicast service provides a service not to every UE 100, but to a group of UEs 100 participating in the multicast service. An MBS session used for the multicast service is referred to as a multicast session. The multicast service can provide the same content to the group of UEs 100 through a method with higher radio efficiency than the broadcast service.

Figure 6:
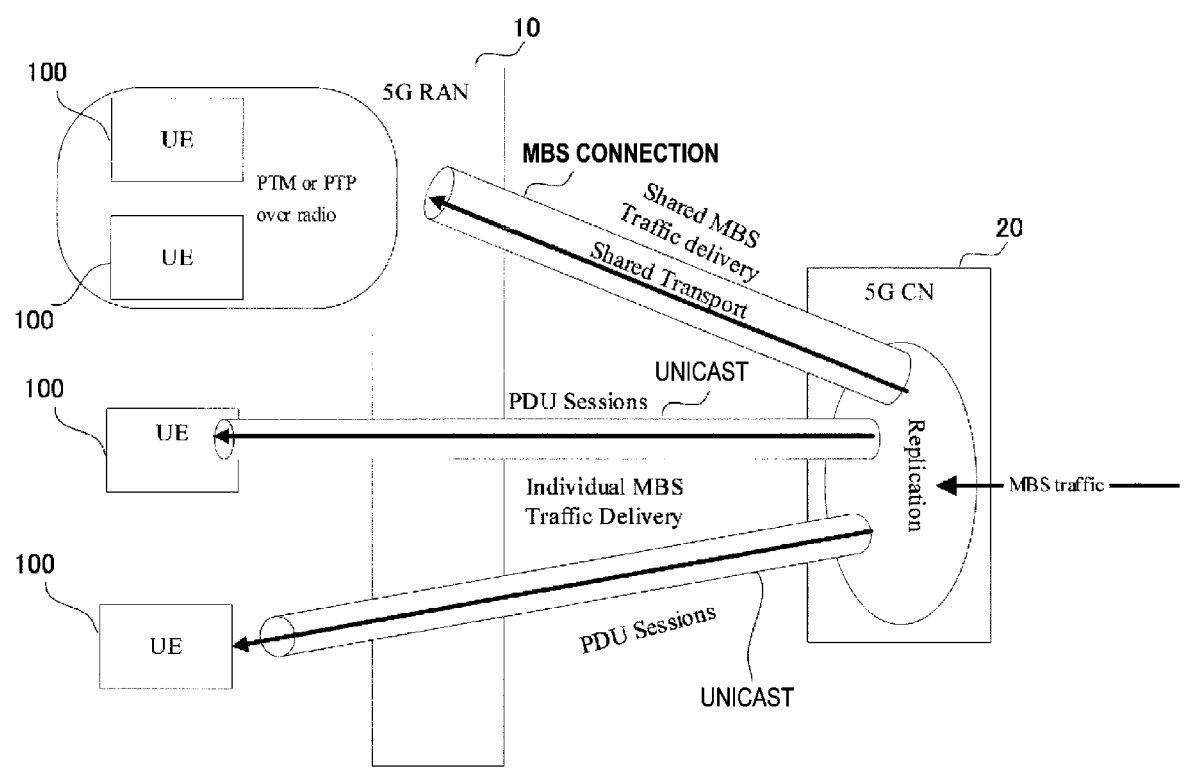
FIG. 6 is a diagram illustrating an overview of MBS traffic delivery according to an embodiment.

FIG. 6 is a diagram illustrating an overview of MBS traffic delivery according to an embodiment.

As illustrated in FIG. 6, MBS traffic is delivered from a single data source (application service provider) to a plurality of UEs. The 5G CN (5GC) 20, which is a 5G core network, receives the MB S traffic from the application service provider and performs Replication of the MBS traffic to deliver the replicated MBS traffic.

From the perspective of the 5GC 20, two multicast delivery methods are possible: 5GC Shared MBS Traffic delivery and 5GC Individual MBS Traffic delivery.

In the 5GC individual MBS traffic delivery method, the 5GC 20 receives a single copy of MBS data packets and delivers individual copies of these MBS data packets to the individual UEs 100 via Protocol Data Unit (PDU) sessions of the individual UEs 100. Thus, one PDU session for each UE 100 needs to be associated with a multicast session.

In the 5GC shared MBS traffic delivery method, the 5GC 20 first receives a single copy of MB S data packets and delivers the single copy of the MB S data packets to a RAN node (i.e., gNB 200). Second, the gNB 200 delivers the single copy to one or more of the UEs 100.

From the perspective of the RAN (5G RAN) 10, two delivery methods are possible for radio transmission of the MBS traffic in the 5GC shared MBS traffic delivery method: a Point-to-Point (PTP) delivery method and a Point-to-Multipoint (PTM) delivery method.

In the PTP delivery method, the gNB 200 wirelessly delivers the individual copies of the MBS data packets to the individual UEs 100. On the other hand, in the PTM delivery method, the gNB 200 wirelessly delivers the single copy of the MBS data packets to a group of the UEs 100. The gNB 200 dynamically determines whether to use the PTM or PTP delivery method as a method for delivering the MBS traffic to one UE 100.

The PTP and PTM delivery methods are mainly related to the user plane. Modes for controlling the MB S traffic delivery include two delivery modes: a first mode and a second mode. FIG. 7 is a diagram illustrating delivery modes according to an embodiment.

As illustrated in FIG. 7, the first mode (Delivery mode 1) is a delivery mode that can be used by the UE 100 in the RRC connected state and is a delivery mode for high QoS requirements. The first mode is used only for multicast sessions among MBS sessions. In an embodiment, the first mode is assumed to be used for multicast sessions, but the first mode may also be used for broadcast sessions. The first mode may be available for the UE 100 in the RRC idle state or the RRC inactive state.

In an embodiment, an MBS reception configuration in the first mode is performed through dedicated signaling (also referred to as "unicast signaling"). Specifically, the MBS reception configuration in the first mode is performed through an RRC Reconfiguration message (or an RRC Release message), which is an RRC message unicast from the gNB 200 to the UE 100. In the first mode, advanced MBS traffic delivery using a split MBS bearer described below is possible.

The MBS reception configuration includes MBS traffic channel information (hereinafter referred to as "MTCH information") about an MBS traffic channel carrying MBS traffic. The MTCH information includes MBS session information relating to an MBS session and scheduling information (hereinafter referred to as "MTCH scheduling information") of an MBS traffic channel corresponding to the MBS session.

Note that the MBS traffic channel is a type of logical channel and may be referred to as a Multicast Traffic Channel (MTCH). The MBS traffic channel is mapped to a Downlink Shared Channel (DL-SCH) being a type of transport channel.

The second mode (Delivery mode 2) is a delivery mode that can be used not only by the UE 100 in the RRC connected state, but also by the UE 100 in the RRC idle state or the RRC inactive state and is a delivery mode for low QoS requirements. The second mode is used for broadcast sessions among MBS sessions. However, the second mode may also be applicable to multicast sessions.

An MBS reception configuration in the second mode is performed through broadcast signaling. Specifically, the MBS reception configuration in the second mode is performed through a logical channel broadcast from the gNB 200 to the UEs 100, for example, a Broadcast Control Channel (BCCH) or a Multicast Control Channel (MCCH). Hereinafter, such a control channel may be referred to as an MBS control channel.

The network can provide different MBS services for different MBS sessions. The MBS session is identified by at least one selected from the group consisting of a Temporary Mobile Group Identity (TMGI), a session identifier, and a group Radio Network Temporary Identifier (RNTI). The TMGI and/or the session identifier is referred to as an MBS session identifier. The TMGI, the session identifier, and the group RNTI are collectively referred to MBS session information. The MB S session identifier may also be referred to as an MB S service identifier or a multicast group identifier.

Split MBS Bearer

A split MBS bearer according to an embodiment is described. The split MBS bearer is available in the first mode described above.

The gNB 200 may configure an MBS bearer split into a PTP communication path and a PTM communication path (hereinafter referred to as a "split MBS bearer" as appropriate) for the UE 100. This allows the gNB 200 to dynamically switch transmission of the MBS traffic to the UE 100 between the PTP (PTP communication path) and the PTM (PTM communication path). The gNB 200 may perform duplication transmission of the same MBS traffic using both the PTP and the PTM to improve reliability. The gNB 200 may perform initial transmission of the MBS traffic to the plurality of UEs 100 in using PTM and perform retransmission of the MBS traffic to a specific UE 100 to improve reliability.

A predetermined layer terminating the split is the MAC layer (HARQ), the RLC layer, the PDCP layer, or the SDAP layer. Although an example in which the predetermined layer terminating the split is the PDCP layer will be mainly described below, the predetermined layer may be the MAC layer (HARQ), the RLC layer, or the SDAP layer.

Figure 8:
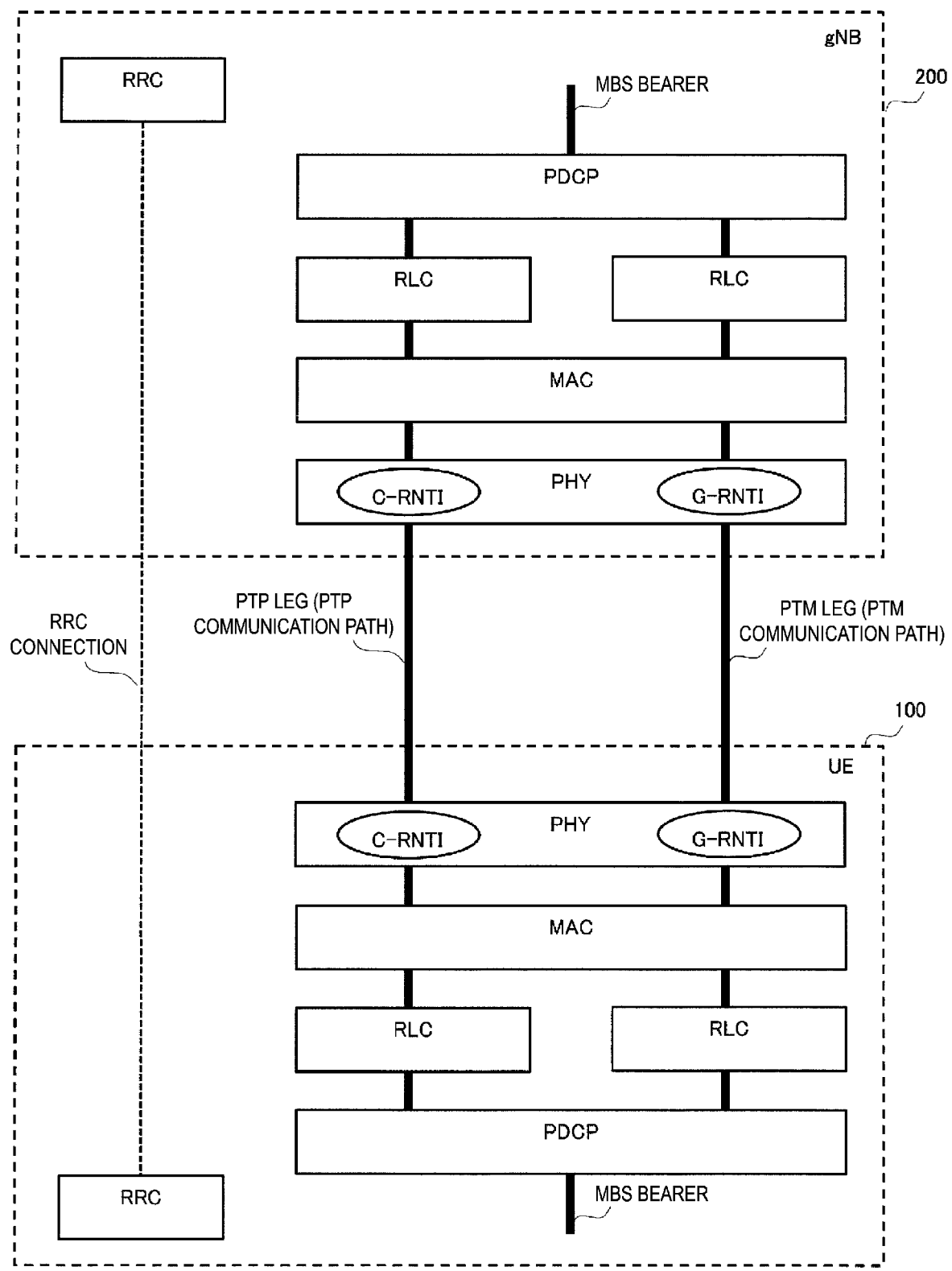
FIG. 8 is a diagram illustrating a split MBS bearer according to an embodiment.

FIG. 8 is a diagram illustrating the split MBS bearer according to an embodiment. Hereinafter, the PTP communication path is referred to as a PTP leg, and the PTM communication path is referred to as a PTM leg. A functional unit corresponding to each layer is referred to as an entity.

As illustrated in FIG. 8, each of the PDCP entity of the gNB 200 and the PDCP entity of the UE 100 splits an MBS bearer, which is a bearer (data radio bearer) used for the MBS, into a PTP leg and a PTM leg. Note that the PDCP entity is provided for each bearer.

Each of the gNB 200 and the UE 100 includes two RLC entities provided per leg: one MAC entity and one PHY entity. The PHY entity may be provided per leg. Note that, in a Dual Connectivity in which the UE 100 communicates with two gNBs 200, the UE 100 may include two MAC entities.

The PHY entity transmits and receives data of the PTP leg using a cell RNTI (Cell Radio Network Temporary Identifier (C-RNTI)) that is allocated to the UE 100 on a one-to-one basis. The PHY entity transmits and receives data of the PTM leg using a group RNTI (Group Radio Network Temporary Identifier (G-RNTI)) allocated to the MBS session on a one-to-one basis. The C-RNTI is different for each UE 100, but the G-RNTI is an RNTI common to a plurality of UEs 100 receiving one MBS session.

For PTM transmission of the MBS traffic (multicast or broadcast) from the gNB 200 to the UE 100 using the PTM leg, the split MBS bearer needs to be established for the UE 100 from the gNB 200, and the PTM leg needs to be activated. In other words, even if the split MBS bearer is established for the UE 100, when the PTM leg is in a deactivation state, the gNB 200 cannot perform the PTM transmission of the MBS traffic using the PTM leg.

In order for the gNB 200 and the UE 100 to perform PTP transmission (unicast) of the MBS traffic using the PTP leg, the split MBS bearer needs to be established for the UE 100 from the gNB 200, and the PTP leg needs to be activated. In other words, even if the split MBS bearer is established for the UE 100, when the PTP leg is in a deactivation state, the gNB 200 cannot perform the PTP transmission of the MBS traffic using the PTP leg.

When the PTM leg is in an activated state, the UE 100 monitors a Physical Downlink Control Channel (PDCCH) to which a G-RNTI associated with the MBS session is applied (i.e., performs blind decoding of the PDCCH using the G-RNTI). The UE 100 may monitor the PDCCH only at a scheduling occasion of the MBS session.

When the PTM leg is in a deactivation state, the UE 100 does not monitor a PDCCH to which a G-RNTI associated with the MBS session is applied (i.e., does not perform blind decoding of the PDCCH using the G-RNTI).

When the PTP leg is in an activated state, the UE 100 monitors a PDCCH to which a C-RNTI is applied. When Discontinuous Reception (DRX) in the PTP leg is configured, the UE 100 monitors a PDCCH for a configured OnDuration period. When a cell (frequency) associated with the MBS session is specified, the UE 100 may monitor a PDCCH for the cell even when the cell is deactivated.

When the PTP leg is in a deactivated state, the UE 100 may monitor a PDCCH to which a C-RNTI is applied in preparation for normal unicast downlink transmission of traffic other than the MBS traffic. However, when a cell (frequency) associated with an MBS session is specified, the UE 100 need not monitor a PDCCH for the MBS session.

Note that it is assumed that the above-described split MBS bearer is configured by use of an RRC message (for example, an RRC Reconfiguration message) transmitted by the RRC entity of the gNB 200 to the RRC entity of the UE 100.

Example of First Mode

An example of the first mode will be described.

Figure 9:
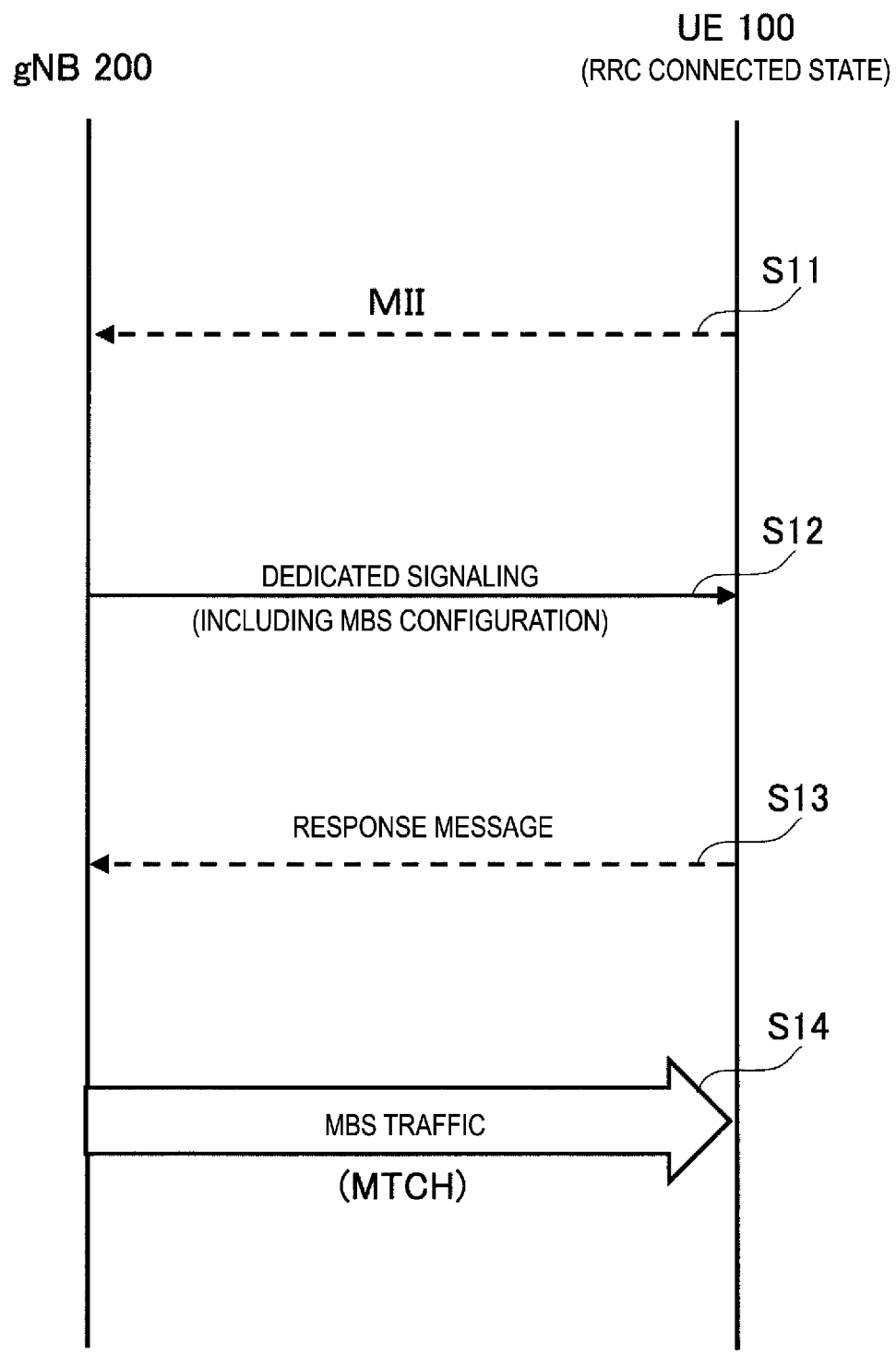
FIG. 9 is a diagram illustrating an operation example of a first mode according to an embodiment.

FIG. 9 is a diagram illustrating an operation example of the first mode according to an embodiment. In FIG. 9, optional steps are illustrated with dashed lines.

As illustrated in FIG. 9, in Step S11, the UE 100 in the RRC connected state transmits an MBS Interest Indication (MII) message to the gNB 200. The MII message includes MBS session information regarding a desired MBS session of the UE 100 (i.e., an MBS session that the UE 100 is interested in receiving). The gNB 200 recognizes the desired MBS session of the UE 100 by receiving the MII message. In this operation pattern, the MII message is a type of RRC message.

In Step S12, the gNB 200 transmits an MBS configuration required for reception of the desired MBS session of the UE 100 through dedicated signaling. In an embodiment, the dedicated signaling is an RRC Reconfiguration message. However, the dedicated signaling may be an RRC Release message.

In Step S13, the UE 100 transmits, to the gNB 200, a response message to the dedicated signaling received in Step S12. The response message is an RRC Reconfiguration Complete message, for example. The gNB 200 receives the response message.

In Step S14, the gNB 200 transmits (for example, multicasts) MBS traffic through the MTCH in accordance with the MBS configuration configured in Step S12. Here, the gNB 200 may perform advanced MBS traffic delivery using a split MBS bearer. The UE 100 receives the MBS traffic.

Figure 10:
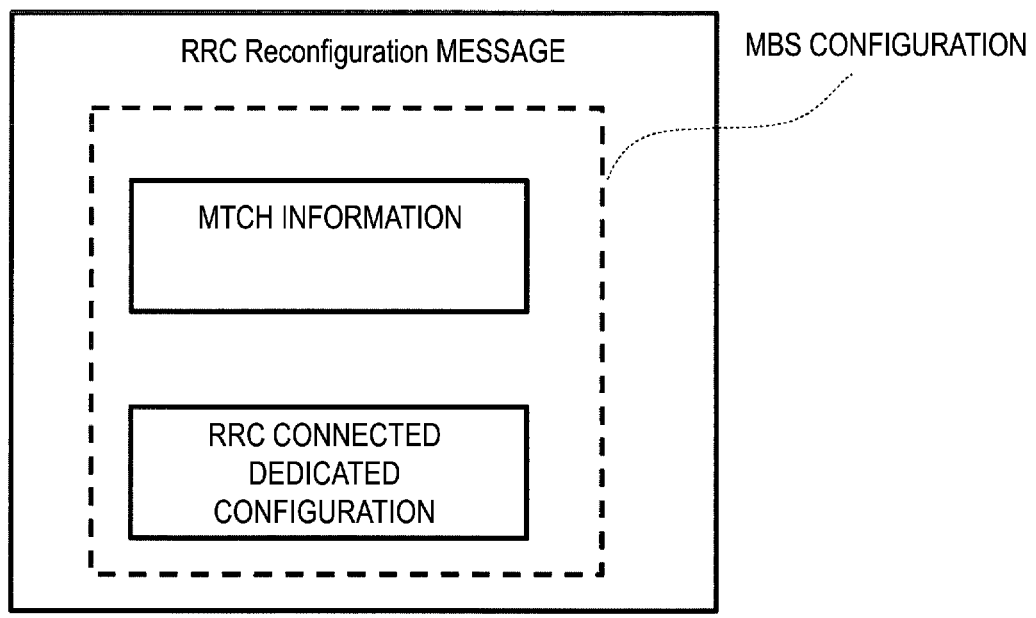
FIG. 10 is a diagram illustrating a configuration example of an RRC Reconfiguration message according to an embodiment.

FIG. 10 is a diagram illustrating a configuration example of an RRC Reconfiguration message according to an embodiment. As illustrated in FIG. 10, the RRC Reconfiguration message transmitted from the gNB 200 to the UE 100 includes an MBS configuration required for MB S reception as an information element.

The MBS configuration in the RRC Reconfiguration message includes MTCH information. The MBS configuration in the RRC Reconfiguration message may further include an RRC connected dedicated configuration applicable only to MBS reception in the RRC connected state.

The MTCH information may have a common configuration in all the RRC states (i.e., RRC connected state, RRC idle state, and RRC inactive state). The MTCH information includes MBS session information (the MBS session identifier and/or the group RNTI) and MTCH scheduling information. The MTCH scheduling information includes a transmission occasion and/or a transmission Bandwidth Part (BWP) of the MTCH.

Here, the group RNTI is an RNTI commonly assigned to the group of UEs 100. The transmission occasion is a candidate of a timing (for example, subframe) at which the gNB 200 transmits the MBS traffic using the MTCH. For example, the transmission occasion may include On Duration, Inactivity Timer, periodicity (cycle)/offset, and DRX Retransmission Timer as parameters thereof. The transmission BWP is a BWP in which the gNB 200 transmits the MBS traffic using the MTCH. The BWP is a bandwidth part that is narrower than the frequency bandwidth of one cell and is for limiting the operating bandwidth of the UE 100.

On the other hand, the RRC connected dedicated configuration is a configuration related to the split MBS bearer or the like, and includes, for example, at least one selected from the group consisting of a bearer configuration of the split MBS bearer, a dynamic switching configuration between the PTP and the PTM, and a PTP leg configuration. Note that the PTM leg configuration can be used in the RRC idle state or the RRC inactive state, and the MTCH information may thus include the PTM leg configuration. The RRC connected dedicated configuration may include an HARQ feedback configuration.

Example of Second Mode

Figure 11:
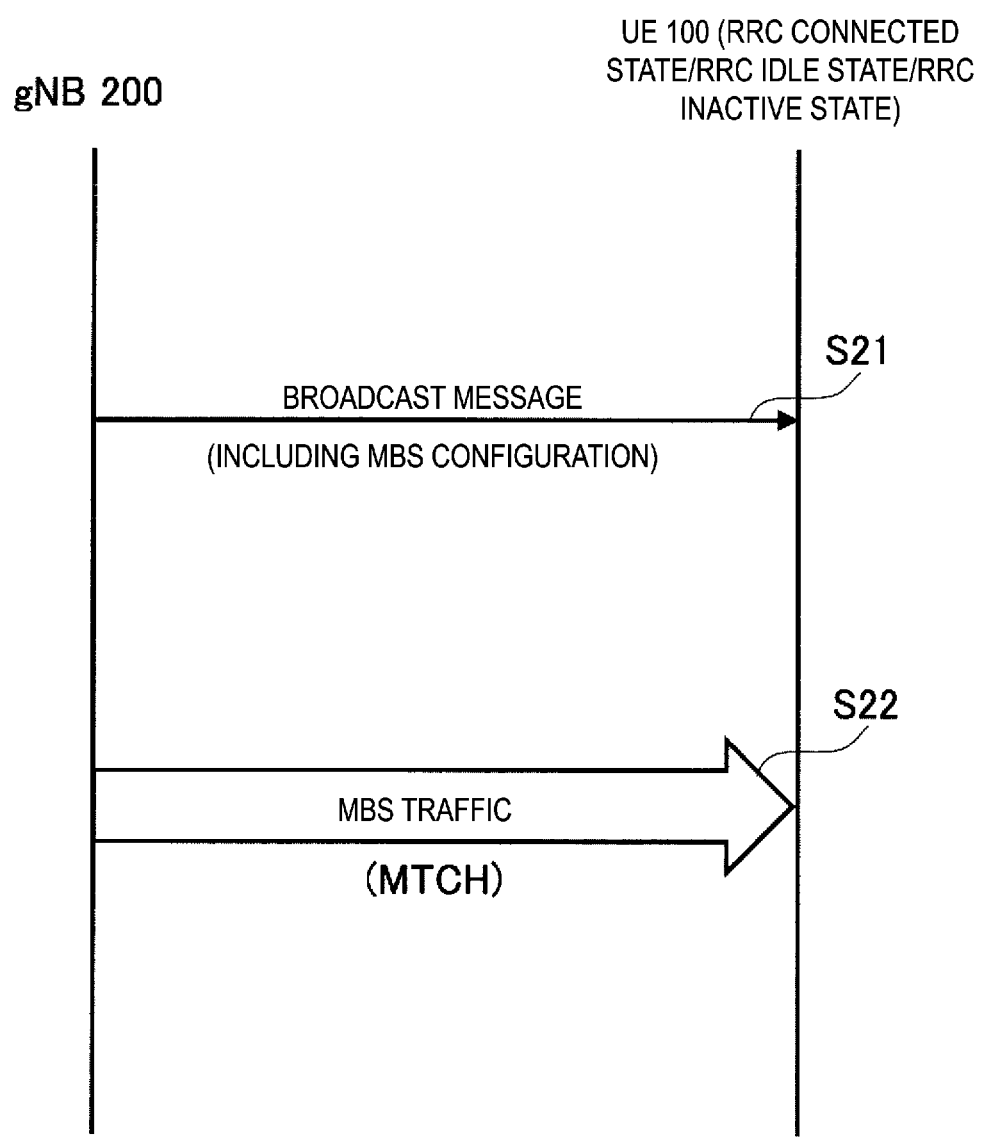
FIG. 11 is a diagram illustrating an operation example of a second mode according to an embodiment.

An example of the second mode will be described. FIG. 11 is a diagram illustrating an operation example of the second mode according to an embodiment. In the second mode, the UE 100 may be in an RRC state being any of the RRC connected state, the RRC idle state, and the RRC inactive state.

As illustrated in FIG. 11, in Step S21, the gNB 200 transmits an MBS configuration required for MBS reception through broadcast signaling. The broadcast signaling is signaling periodically transmitted through the BCCH and/or the MCCH. Hereinafter, an example in which the broadcast signaling is signaling transmitted through the MCCH will be mainly described. The UE 100 receives the broadcast signaling.

In Step S22, the gNB 200 transmits (for example, broadcasts) MBS traffic through the MTCH in accordance with the MBS configuration configured in Step S21. The UE 100 receives the MBS traffic.

Figure 12:
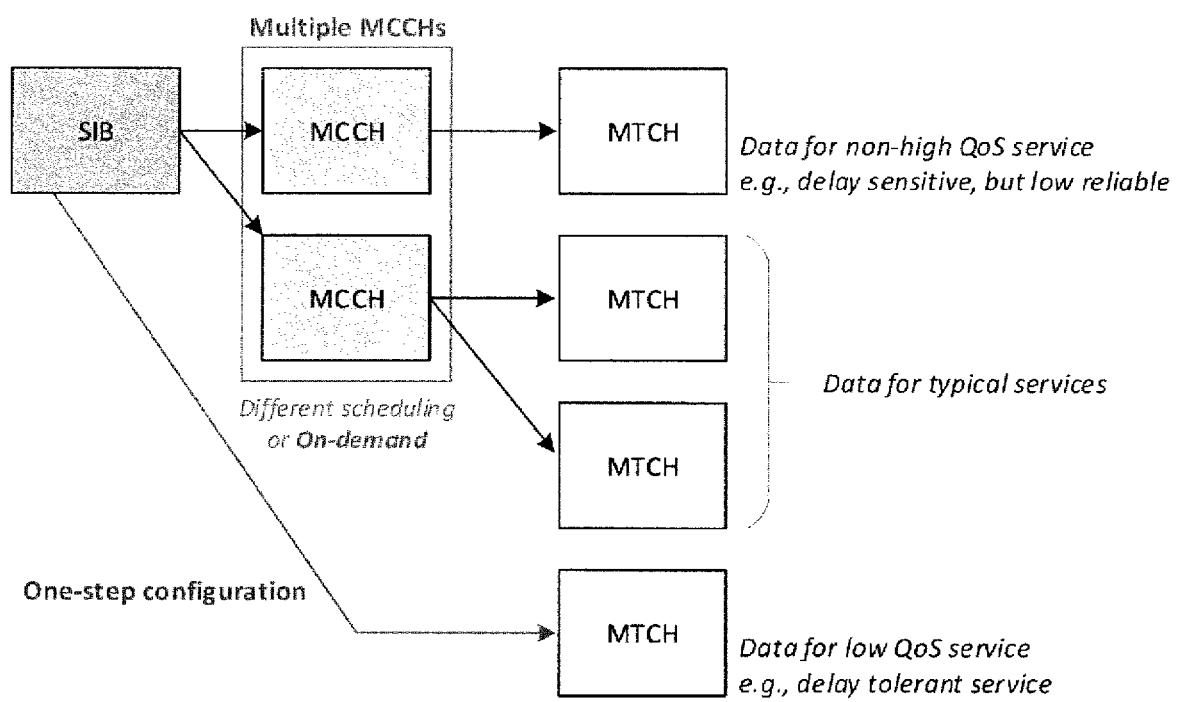
FIG. 12 is a diagram illustrating a variation of an MBS configuration of the second mode according to an embodiment.

FIG. 12 is a diagram illustrating a variation of the MBS configuration in the second mode according to an embodiment.

As illustrated in FIG. 12, the gNB 200 provides the scheduling information of the MCCH to the UE 100 using a system information block (SIB) transmitted through the BCCH. The UE 100 receives the MCCH (i.e., MBS configuration) based on the SIB received from the gNB 200 and receives the MTCH (i.e., MBS traffic) based on the received MCCH. Such a configuration may be referred to as a Two-step configuration.

The gNB 200 may provide the MBS configuration to the UE 100 using the SIB. In this case, the UE 100 receives the MTCH (i.e., MBS traffic) based on the SIB received from the gNB 200. Such a configuration may be referred to as a One-step configuration.

The gNB 200 may configure Multiple MCCHs in one cell of the gNB 200. The MCCHs may be different from each other in scheduling (for example, transmission cycle). Any of the MCCHs may be provided on demand upon request from the UE 100.

Figure 13:
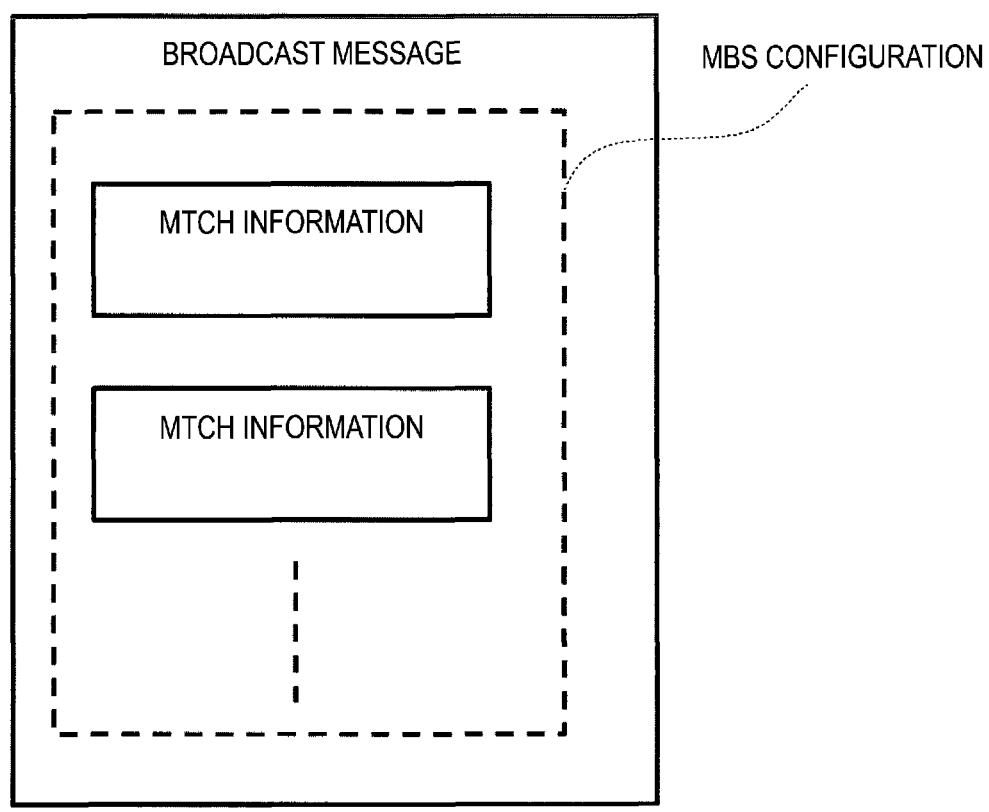
FIG. 13 is a diagram illustrating a configuration example of a broadcast message according to an embodiment.

FIG. 13 is a diagram illustrating a configuration example of a broadcast message according to an embodiment. The broadcast message corresponds to the broadcast signaling for providing an MBS configuration.

As illustrated in FIG. 13, the broadcast message transmitted from the gNB 200 to the UE 100 includes an MBS configuration required for MBS reception as an information element.

The MBS configuration in the broadcast message includes one or more pieces of MTCH information. FIG. 13 illustrates an example in which the broadcast message includes a plurality of pieces of MTCH information corresponding to a plurality of MBS sessions (a plurality of MTCHs).

Operation According to Embodiment

An operation according to an embodiment will be described.

As described above, assuming that the two delivery modes of the first mode and the second mode coexist, the following problem may occur when the UE 100 performing MBS reception fixedly operates in any one of the delivery modes.

First, a scenario is assumed in which the UE 100 in the RRC connected state performs the MBS reception in the first mode. In such a scenario, when the load on the gNB 200 increases or no ongoing data for a multicast session is present, the UE 100 is transitioned to the RRC idle state or the RRC inactive state. As a result, the load on the gNB 200 and the load on the UE 100 can decrease. However, when the UE 100 is transitioned to the RRC idle state or the RRC inactive state, the UE 100 may not be able to continue the MBS reception.

Second, a scenario is assumed in which the UE 100 in the RRC idle state or the RRC inactive state performs the MBS reception in the second mode. In such a scenario, when the load on the gNB 200 is low and the UE 100 can be transitioned to the RRC connected state and switched to the first mode, advanced MBS traffic delivery using, for example, a split MBS bearer is possible.

Figure 14:
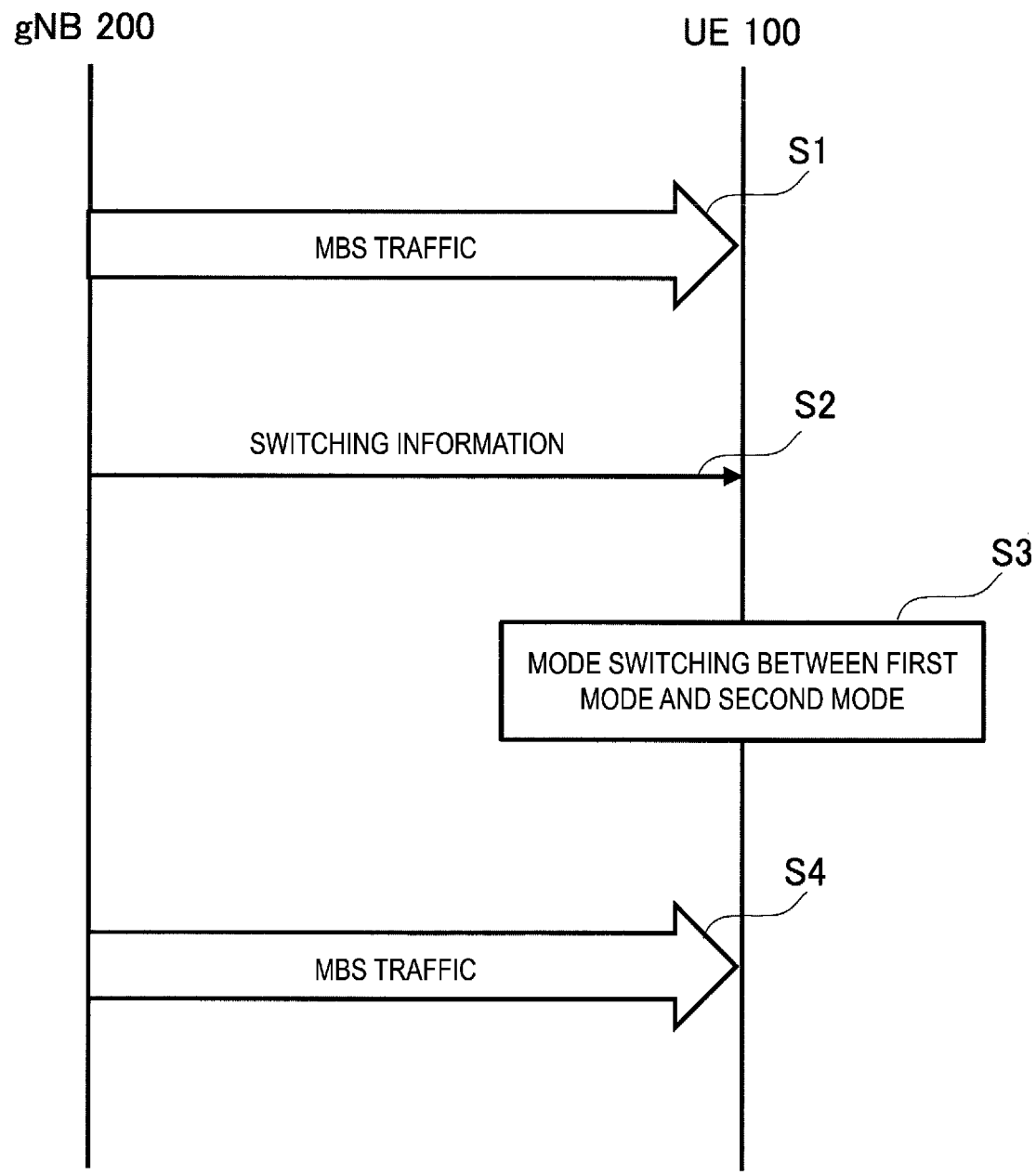
FIG. 14 is a diagram illustrating an operation according to an embodiment.

In an operation according to an embodiment, control of the gNB 200 enables mode switching between the first mode and the second mode. FIG. 14 is a diagram illustrating an operation according to an embodiment.

As illustrated in FIG. 14, in Step S1, the UE 100 operating in the first mode or the second mode receives MBS traffic from the gNB 200 through the MTCH. The first mode is a delivery mode in which an MBS configuration is provided through dedicated signaling, and the second mode is a delivery mode in which the MBS configuration is provided through broadcast signaling.

In Step S2, the gNB 200 transmits, to the UE 100, switching information for switching a delivery mode between the first mode and the second mode. The switching information may be transmitted through dedicated signaling (for example, RRC Reconfiguration message) and/or broadcast signaling (for example, SIB, MCCH, or paging). The UE 100 receives the switching information.

In Step S3, the UE 100 performs mode switching between the first mode and the second mode based on the switching information from the gNB 200. Specifically, the UE 100 performs mode switching from the first mode to the second mode based on switching information for switching the delivery mode from the first mode to the second mode. The UE 100 performs mode switching from the first mode to the second mode based on switching information for switching the delivery mode from the first mode to the second mode.

In Step S4, the UE 100 operating in the mode after the switching receives the MBS traffic from the gNB 200 through the MTCH.

As described above, by performing the mode switching between the first mode and the second mode under control of the gNB 200, the first mode and the second mode can be appropriately used. Even when the mode switching is performed, the UE 100 can easily continue the MBS reception.

First Operation Example

A first operation example according to an embodiment will be described. In the following operation example, mode switching from the first mode to the second mode will be mainly described.

In the present operation example, before transitioning the UE 100 performing PTM reception in the first mode in the RRC connected state to the RRC idle state or the RRC inactive state, the gNB 200 switches the UE 100 from the first mode to the second mode. For example, the gNB 200 sequentially transitions the UEs 100 having started MBS reception in the second mode to the RRC idle state or the RRC inactive state. As a result, the load on the gNB 200 and the load on the UE 100 can be reduced while the MBS reception of the UE 100 can continue.

Specifically, the gNB 200 transmits, to the UE 100 operating in the first mode in the RRC connected state, switching information for switching to the second mode. The UE 100 switches from the first mode to the second mode based on the switching information received from the gNB 200.

The UE 100 switches from the first mode to the second mode and then transitions to the RRC idle state or the RRC inactive state. The UE 100 in the RRC idle state or the RRC inactive state then receives MBS traffic from the gNB 200 using an MBS configuration provided through broadcast signaling.

In the present operation example, the UE 100 may transmit a notification to the gNB 200 based on the switching from the first mode to the second mode. The gNB 200 transitions the UE 100 to the RRC idle state or the RRC inactive state upon reception of the notification from the UE 100. Accordingly, after confirming that the UE 100 can continue the MBS reception, the gNB 200 can transition the UE 100 to the RRC idle state or the RRC inactive state.

Figure 15:
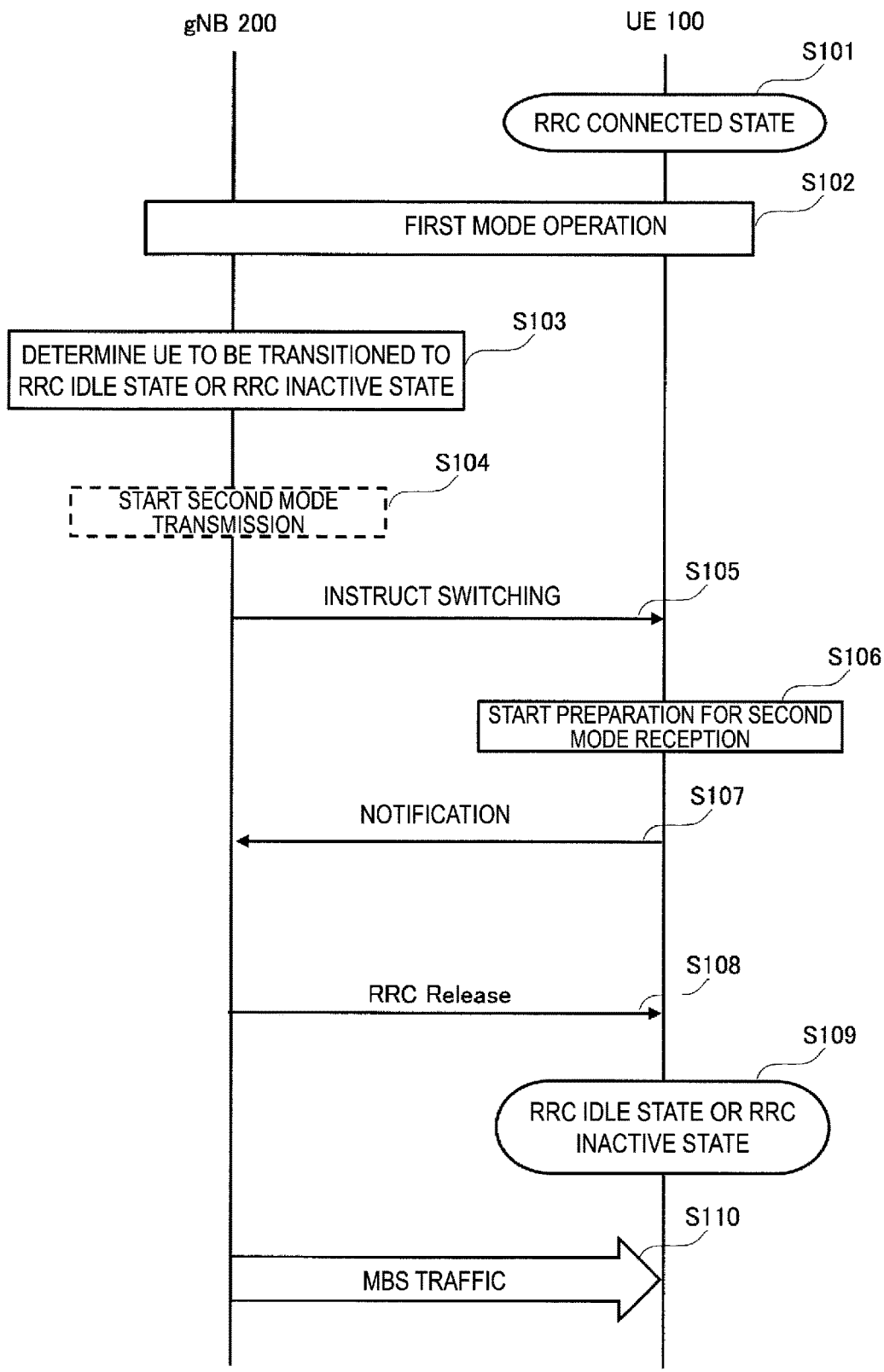
FIG. 15 is a diagram illustrating a first operation example according to an embodiment.

FIG. 15 is a diagram illustrating the first operation example according to an embodiment. In FIG. 15, optional steps are illustrated with dashed lines.

As illustrated in FIG. 15, in Step S101, the UE 100 is in the RRC connected state in a cell of the gNB 200.

In Step S102, the gNB 200 and the UE 100 perform the operation in the first mode as described above (see FIG. 9). For example, the UE 100 receives an MBS configuration transmitted from the gNB 200 through dedicated signaling and receives MBS traffic (MTCH) transmitted from the gNB 200 through PTM using the MBS configuration.

In Step S103, the gNB 200 determines the UE 100 to be transitioned to the RRC idle state or the RRC inactive state in consideration of the load on the gNB 200 (for example, a radio resource usage rate and/or a hardware resource usage rate). Hereinafter, description will be given on the assumption that the load on the gNB 200 increases.

Here, the gNB 200 may determine that the UE 100 in which there is no uplink transmission for a certain period of time is the UE 100 to be transitioned to the RRC idle state or the RRC inactive state. The gNB 200 may determine that the UE 100 interested in an MBS session without downlink transmission for a certain period of time or the UE 100 receiving MBS traffic thereof (or joining a multicast group thereof) is the UE 100 to be transitioned to the RRC idle state or the RRC inactive state. The gNB 200 may determine that all the UEs 100 receiving a certain MBS session are the UEs 100 to be transitioned to the RRC idle state or the RRC inactive state.

In Step S104, the gNB 200 starts transmission in the second mode. Specifically, the gNB 200 starts transmission of broadcast signaling in the second mode and/or transmission of MBS traffic (MTCH) in the second mode. Note that Step S104 may be performed after Step S105.

In Step S105, the gNB 200 transmits, to the UE 100 determined in Step S103, an instruction to switch the reception mode to the second mode as switching information. The instruction to switch the reception mode to the second mode includes at least one of the following pieces of information.

- An MBS session identifier, a group RNTI, an MBS bearer ID, and/or a PTM Logical Channel ID (LCID) of a reception mode switching target (a currently received MBS session)
- A group RNTI, an MBS bearer ID, and/or a PTM LCID after the reception mode switching (MBS session to be received)
- Timing information indicating the execution timing of the reception mode switching. The timing information may be represented by an absolute time (SFN or the like) and/or a relative time (timer value or the like).

In Step S106, the UE 100 starts preparation for the second mode reception in response to the switching instruction received from the gNB 200. For example, the UE 100 attempts to receive broadcast signaling (SIB and/or MCCH) and MTCH. When the timer value is received in Step S105, the UE 100 starts a timer.

In Step S107, the UE 100 notifies the gNB 200 of reception preparation completion upon reception in the second mode. The UE 100 may transmit the notification to the gNB 200 upon reception completion of the SIB and/or the MCCH. The UE 100 may transmit the notification to the gNB 200 upon reception completion of the MTCH. This notification may be an RRC message and/or a MAC Control Element (CE). As such a notification, the UE 100 may transmit, to the gNB 200, Release Assistance Information (RAI), which is an RRC message for prompting the gNB 200 to transition the UE 100 to the RRC idle state or the RRC inactive state. The UE 100 may include information indicating second mode reception preparation completion in the RAI.

In Step S108, based on the notification from the UE 100, the gNB 200 transmits an RRC Release message to the UE 100 for which the reception preparation has been completed. Thus, the gNB 200 transitions the UE 100 to the RRC idle state or the RRC inactive state. Note that the gNB 200 transmits an RRC Release message including a Suspend Config as an information element when transitioning the UE 100 to the RRC inactive state. The UE 100 may discard or disable the RRC connected dedicated configuration configured through dedicated signaling.

In Step S109, the UE 100 transitions to the RRC idle state or the RRC inactive state upon reception of the RRC release message.

In Step S110, the UE 100 receives MBS traffic (MTCH) transmitted from the gNB 200 through PTM using the MBS configuration provided from the gNB 200 through broadcast signaling.

In Step S106, a case is also assumed in which the UE 100 cannot start the second mode reception within a period until the reception mode switching occurrence timing. Examples of such a case include a case in which reception cannot start at the time of SFN and a case in which reception cannot start when the timer expires. In this case, in Step S107, the UE 100 may transmit a reception preparation failure notification to the gNB 200. When the gNB 200 receives the reception preparation failure notification from the UE 100, the UE 100 may be maintained in the RRC connected state.

Second Operation Example

A second operation example according to an embodiment will be described focusing on differences from the above operation example. The present operation example is an operation based on the first operation example described above.

In the above-described first operation example, when the first mode is switched to the second mode, packet loss or delay of the MBS traffic in the UE 100 may occur due to acquisition of the broadcast signaling (SIB and/or MCCH), for example.

Here, the UE 100 can detect the packet loss based on discontinuity of sequence numbers of packets, for example, in the PDCP layer. However, when the PDCP entity in the second mode is different from the PDCP entity in the first mode (i.e., a new PDCP entity is established), the UE 100 cannot detect the packet loss. The UE 100 also cannot detect the packet loss when the PDCP entity is re-established. There is a possibility that packet header compression/decompression processing (for example, Robust Header Compression (RoHC)) and/or security processing by the PDCP entity cannot continue.

The UE 100 according to the present operation example performs the reception processing of the MBS traffic in the second mode by continuously using the PDCP entity used for the reception processing of the MBS traffic in the first mode. Thus, the problem as described above can be solved.

Figure 16:
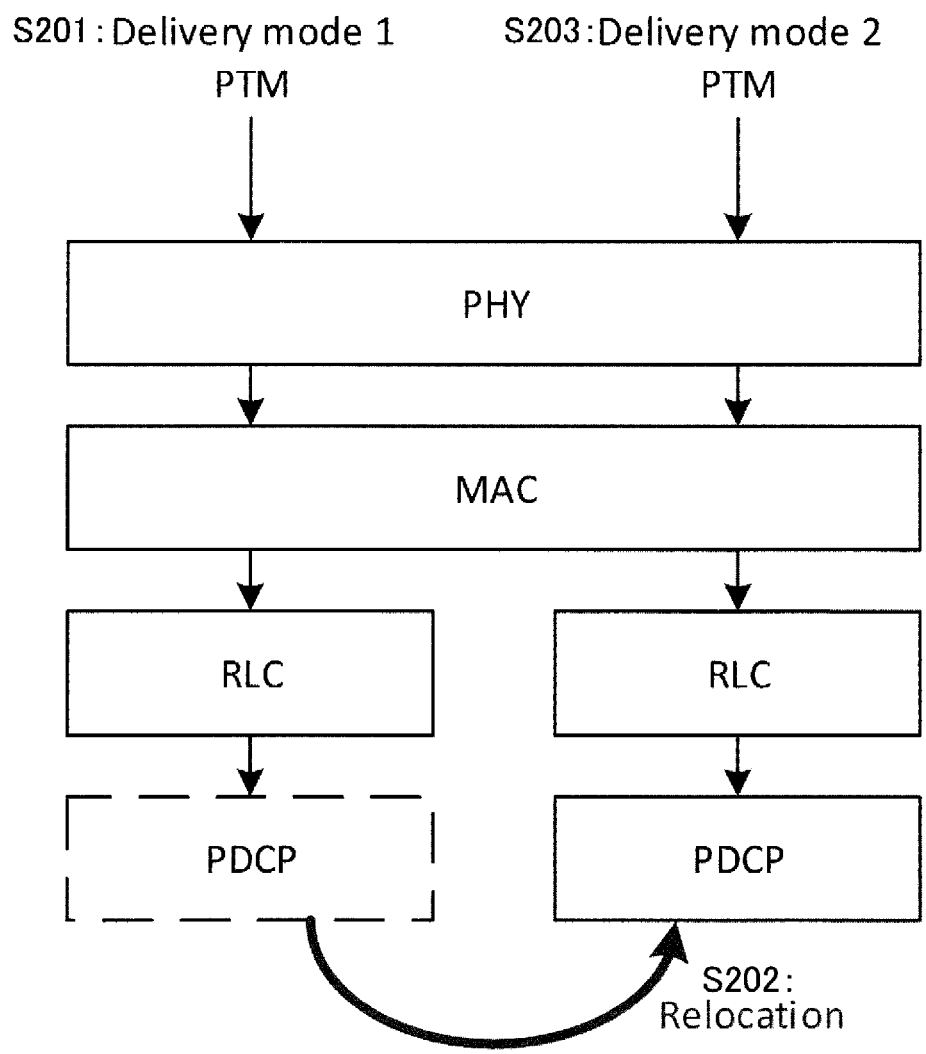
FIG. 16 is a diagram illustrating a second operation example according to an embodiment.

FIG. 16 is a diagram illustrating the second operation example according to an embodiment. Specifically, FIG. 16 illustrates an operation of the UE 100 regarding MBS traffic reception.

As illustrated in FIG. 16, in Step S201, the UE 100 receives MBS traffic transmitted through PTM from the gNB 200 in the first mode (Delivery mode 1). This MBS traffic belongs to a specific MBS session. In the UE 100, the PHY entity, the MAC entity, the RLC entity and the PDCP entity process the MBS traffic in the first mode. Here, the PDCP entity performs detection processing of packet loss based on the sequence number included in the header of each packet (PDCP packet) of the MBS traffic and performs header decompression processing through RoHC.

The gNB 200 assigns the same PDCP sequence numbers in the first mode and the second mode to the MBS traffic of the MBS session (specific MBS session) being a reception mode switching target and transmits the MBS traffic.

In Step S202, when performing reception mode switching (for example, when receiving a switching instruction), the UE 100 relocates the PDCP entity in the first mode to the second mode. Specifically, the UE 100 relocates the PDCP entity located as the upper layer of the RLC entity in the first mode as the upper layer of the RLC entity in the second mode. The UE 100 may perform the relocation by changing a linking relationship between the PDCP entity and the RLC entity (LCID). Accordingly, PDCP context information (PDCP sequence number, RoHC context) of the first mode is taken over in the second mode.

In Step S203, the UE 100 receives the MBS traffic transmitted through PTM from the gNB 200 in the second mode (Delivery mode 2). That is, the UE 100 continues data reception of the specific MBS session in the second mode. In the UE 100, the PHY entity, the MAC entity, the RLC entity, and the PDCP entity process the MBS traffic in the second mode. Here, the PDCP entity continues detection processing of packet loss and also continues header decompression processing through RoHC using the PDCP context information taken over from the first mode.

Note that the PDCP relocation according to the present operation example may be performed by newly establishing a PDCP entity for the second mode or by re-establishing a PDCP entity and taking over the PDCP context information at the time of the first mode to the PDCP entity for the second mode.

Third Operation Example

A third operation example according to an embodiment will be described focusing on differences from the above operation examples. The present operation example is another operation example for the same problem as that of the above-described second operation example.

In the present operation example, the gNB 200 establishes, in the UE 100, a bearer (i.e., a split bearer) split into a first communication path for the first mode (hereinafter referred to as a "first mode leg") and a second communication path for the second mode (hereinafter referred to as a "second mode leg"). When the first mode is switched to the second mode, the UE 100 switches from the first mode leg to the second mode leg while maintaining the PDCP entity.

Figure 17:
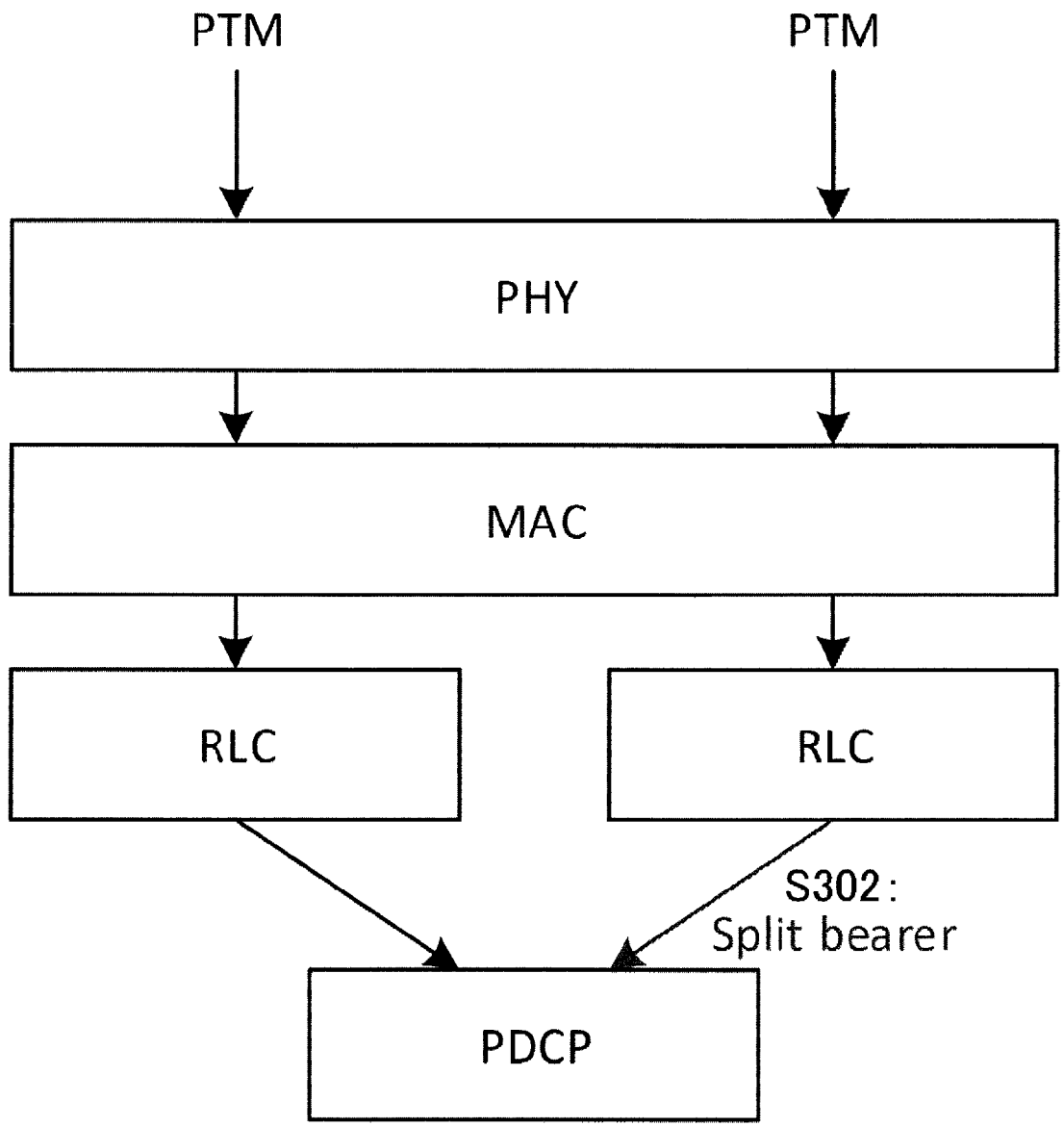
FIG. 17 is a diagram illustrating a third operation example according to an embodiment.

FIG. 17 is a diagram illustrating the third operation example according to an embodiment. Specifically, FIG. 17 illustrates an operation of the UE 100 regarding MBS traffic reception. Here, description will be given mainly of differences from the second operation example described above.

As illustrated in FIG. 17, in Step S301, the UE 100 receives MBS traffic transmitted through PTM from the gNB 200 by using the first mode leg. This MBS traffic belongs to a specific MBS session. In the UE 100, the PHY entity, the MAC entity, the RLC entity, and the PDCP entity process the MBS traffic of the first mode leg.

The gNB 200 assigns the same PDCP sequence numbers in the first mode leg and the second mode leg to the MBS traffic of the MBS session (specific MBS session) being a reception mode switching target, and transmits the MBS traffic.

In Step S302, when performing reception mode switching (for example, when receiving a switching instruction), the UE 100 changes the first mode PDCP entity so as to be linked to the second mode leg (RLC entity, LCID). Accordingly, PDCP context information (PDCP sequence number, RoHC context) of the first mode is taken over in the second mode.

In Step S303, the UE 100 receives the MBS traffic transmitted through PTM from the gNB 200 by using the second mode leg. That is, the UE 100 continues data reception of the specific MBS session in the second mode. The PDCP entity continues detection processing of packet loss and also continues header decompression processing through RoHC using the PDCP context information taken over from the first mode. Note that the UE 100 may release (delete) the first mode leg after switching to the second mode, for example, at the time of receiving the RRC Release message.

Fourth Operation Example

A fourth operation example according to an embodiment will be described focusing on differences from the operation examples described above.

In the operation examples described above, it is assumed that the MTCH scheduling of the first mode and the MTCH scheduling of the second mode are different for one MBS session. However, making the MTCH scheduling the same in the first mode and the second mode for the MBS session can streamline mode switching for this MBS session. Making the group RNTI of the first mode and the group RNTI of the second mode the same for the MBS session can streamline mode switching for this MBS session.

In the present operation example, the gNB 200 transmits MTCH scheduling information, which is scheduling information of an MBS traffic channel, through dedicated signaling (i.e., signaling of the first mode). The MTCH scheduling information is associated with one MBS session. The gNB 200 transmits MTCH scheduling information that is the same as the MTCH scheduling information of the first mode for this MBS session through broadcast signaling (i.e., signaling of the second mode).

In the present operation example, the gNB 200 may transmit switching information including a notification indicating that the MTCH scheduling information transmitted through dedicated signaling is also applicable to the second mode.

Figure 18:
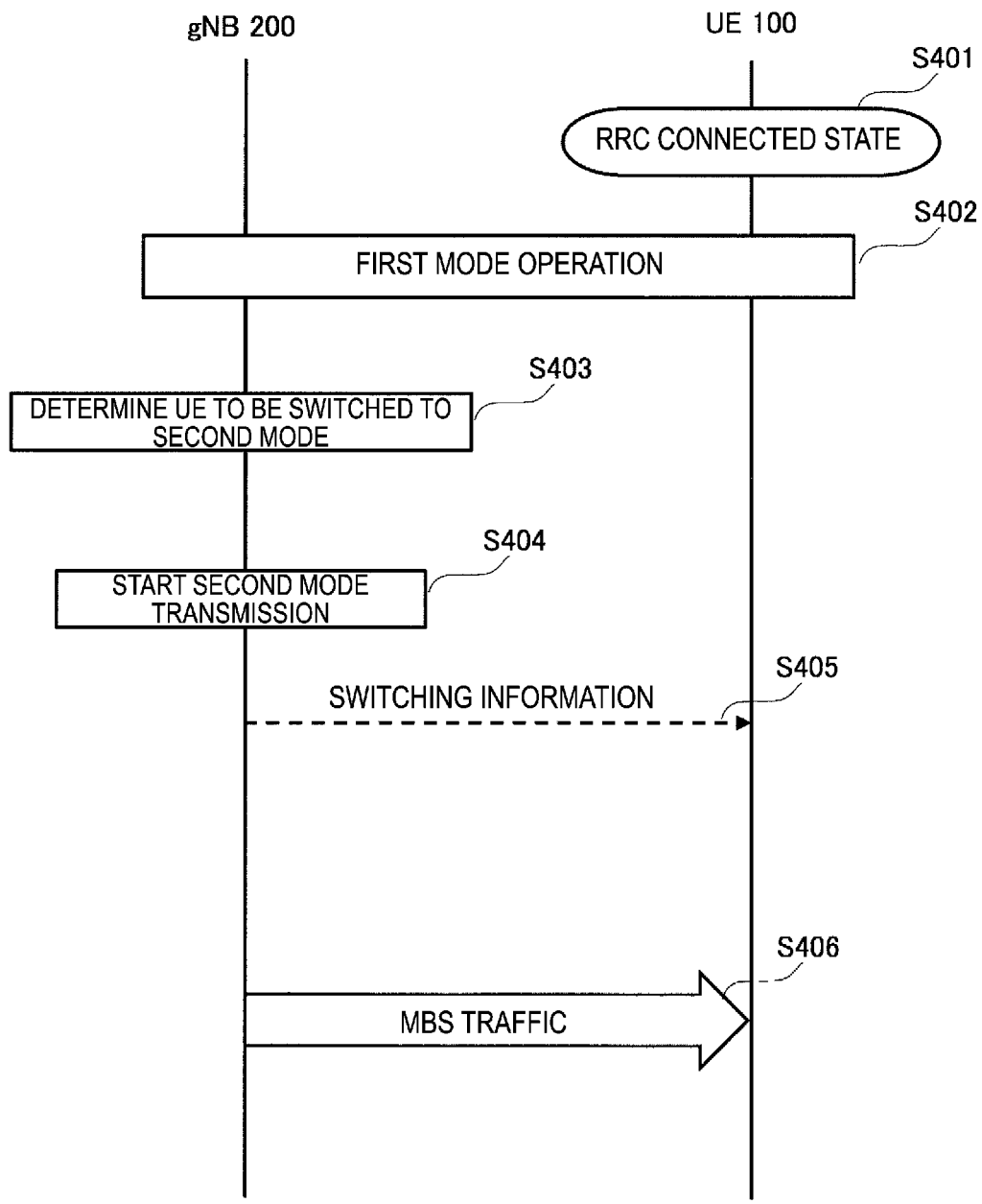
FIG. 18 is a diagram illustrating a fourth operation example according to an embodiment.

FIG. 18 is a diagram illustrating the fourth operation example according to an embodiment. Here, description will be given mainly on differences from the first operation example described above. In FIG. 18, optional steps are illustrated with dashed lines.

As illustrated in FIG. 18, in Step S401, the UE 100 is in the RRC connected state in a cell of the gNB 200.

In Step S402, the gNB 200 and the UE 100 perform the operation in the first mode as described above (see FIG. 9). For example, the UE 100 receives an MBS configuration (MTCH information) transmitted from the gNB 200 through dedicated signaling and receives MBS traffic (MTCH) transmitted through PTM manner from the gNB 200 by using the MTCH information. This MBS traffic belongs to a specific MBS session.

In Step S403, the gNB 200 determines the UE 100 to be switched from the first mode to the second mode.

In Step S404, the gNB 200 starts transmission for the specific MBS session in the second mode. Specifically, the gNB 200 starts transmission of broadcast signaling in the second mode. Note that Step S404 may be performed after Step S405. Here, the gNB 200 transmits, through broadcast signaling, MTCH information that is the same as the MTCH information transmitted through broadcast signaling in the first mode.

In Step S405, the gNB 200 may transmit the above reception mode switching instruction as switching information to the UE 100 determined in Step S403. The gNB 200 may transmit, to the UE 100, the switching information including information indicating that the MTCH scheduling information (MTCH information) is the same, such as "Same MTCH info {true}". The gNB 200 may transmit, to the UE 100, switching information including a notification indicating that the specific MBS session can also be received in the second mode. The gNB 200 may transmit such switching information through broadcast signaling (such as SIB).

In Step S406, the UE 100 regards the MTCH information as the same information based on the switching instruction received from the gNB 200 and continues reception of the MBS traffic (MTCH) even before receiving the broadcast signaling from the gNB 200.

As in the above-described first operation example, the gNB 200 may transition the UE 100 from the RRC connected state to the RRC idle state or the RRC inactive state based on the notification from the UE 100. Here, for example, if no unicast data transmission is present, the UE 100 may transmit a notification (for example, RAI) even when receiving the specific MB S session or even when being interested in receiving the specific MBS session. The gNB 200 may determine that the transition to the second mode is completed when no UE 100 receiving the specific MBS session in the first mode is present.

Fifth Operation Example

A fifth operation example according to an embodiment will be described focusing on differences from the operation examples described above.

As described above, the gNB 200 switches the specific MBS session from the first mode to the second mode due to the load on the gNB 200. Such switching to the second mode may be temporary switching only while the gNB 200 is under a heavy load.

The specific MBS session switched to the second mode is an MBS session to which the first mode may be originally applied. Thus, it is not preferable that the UE 100 originally in the RRC idle state or the RRC inactive state starts reception of the specific MBS session.

In the present operation example, after the switching from the first mode to the second mode, the gNB 200 transmits broadcast signaling (for example, MCCH or SIB) including MBS session information indicating the MBS session switched from the first mode to the second mode. Accordingly, the UE 100 originally in the RRC idle state or the RRC inactive state can recognize the MBS session switched to the second mode based on the broadcast signaling. Thus, the UE 100 can avoid starting reception of the MBS session switched to the second mode, for example.

In the present operation example, after the switching from the first mode to the second mode, the gNB 200 transmits broadcast signaling including MBS session information indicating an MBS session to be switched from the second mode to the first mode, for example, when the load on the gNB 200 decreases. Accordingly, the UE 100 switched to the second mode can perform an operation of returning to the first mode.

Figure 19:
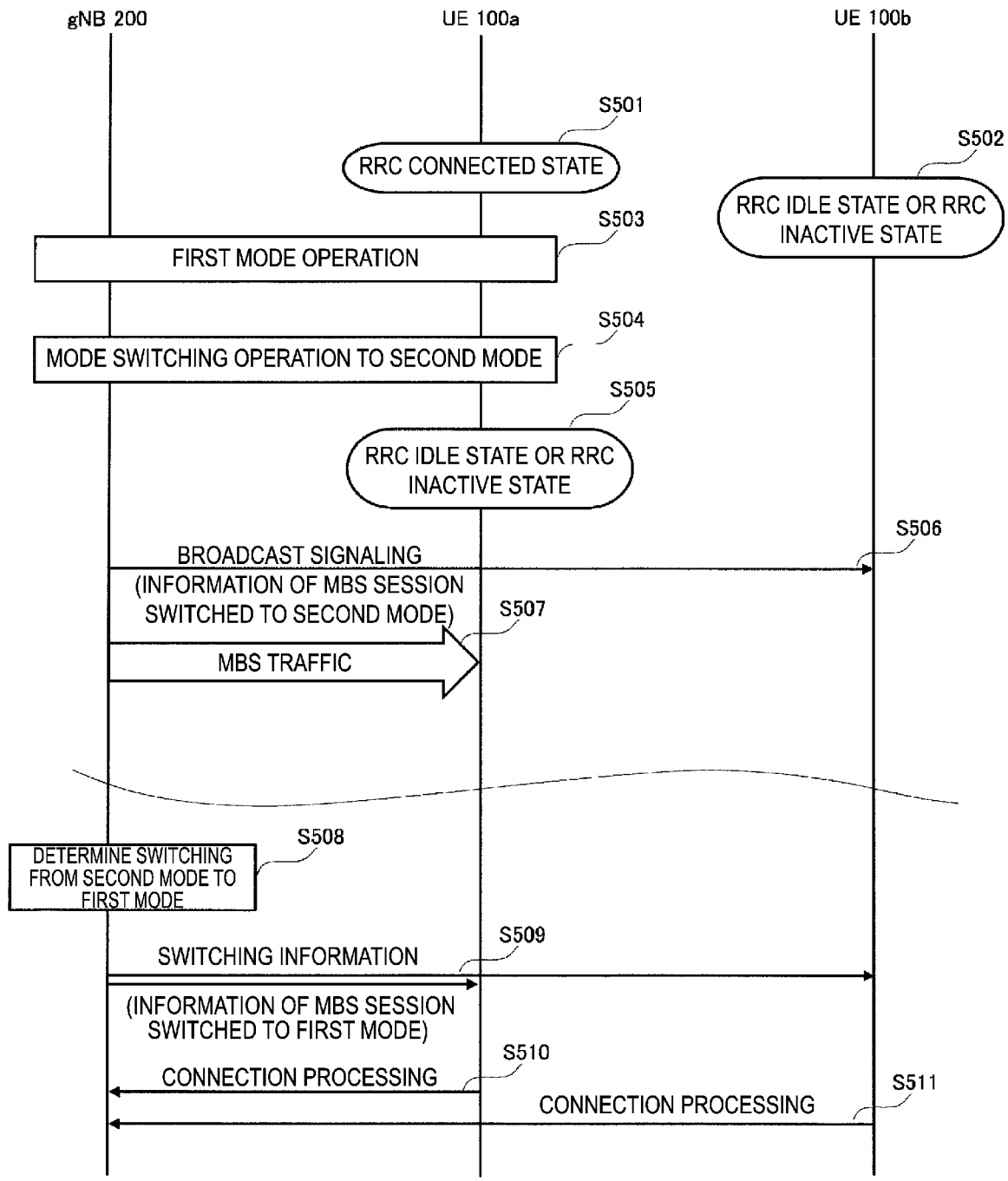
FIG. 19 is a diagram illustrating a fifth operation example according to an embodiment.

FIG. 19 is a diagram illustrating the fifth operation example according to an embodiment.

As illustrated in FIG. 19, in Step S501, a UE 100*a* is in the RRC connected state in a cell of the gNB 200.

In contrast, in Step S502, a UE 100*b* is in the RRC idle state or the RRC inactive state in the cell of the gNB 200.

In Step S503, the gNB 200 and the UE 100*a* perform the operation in the first mode as described above for the specific MBS session.

In Step S504, the gNB 200 and the UE 100*a* perform the mode switching operation as described above for the specific MBS session.

In Step S505, the UE 100*a* transitions from the RRC connected state to the RRC idle state or the RRC inactive state.

In Step S506, the gNB 200 transmits information indicating that the specific MBS session is an MBS session switched from the first mode through broadcast signaling (for example, MCCH) of the second mode. The UE 100*a* and the UE 100*b* receive this broadcast signaling. Such a notification includes MBS session information of the specific MBS session. The notification may be a notification indicating that the specific MBS session is to be excluded from the second mode after the UE 100*a* returns to the RRC connected state.

In Step S507, the UE 100*a* continues the MBS reception in the RRC idle state or the RRC inactive state.

On the other hand, even when interested in receiving the specific MBS session, the UE 100*b* determines that the specific MBS session cannot be received in the RRC idle state/RRC inactive state based on the broadcast signaling in Step S506. To receive the specific MBS session, the UE 100*b* needs to transition to the RRC connected state and acquire the MBS configuration from the gNB 200 through dedicated signaling.

The UE 100*b* may start receiving the specific MBS session in the RRC idle state or the RRC inactive state. In this case, the UE 100*b* may attempt to establish or recover the RRC connection with the gNB 200 based on a notification (switching information) from the gNB 200 in Step S509 described below.

Subsequently, in Step S508, the gNB 200 determines to switch from the second mode to the first mode for the specific MBS session. For example, the gNB 200 determines to switch in this manner when the load on the gNB 200 decreases.

In Step S509, the gNB 200 transmits switching information for switching from the second mode to the first mode for the specific MBS session. The switching information includes MBS session information of the specific MBS session. The switching information may be transmitted through broadcast signaling (SIB, MCCH, or paging message), MTCH, and/or MAC CE. The UE 100*a* and the UE 100*b* receive the switching information from the gNB 200.

In Step S510, based on the switching information received from the gNB 200 in Step S509, the UE 100*a* performs, together with the gNB 200, connection processing (random access procedure) for establishing or recovering RRC connection with the gNB 200. As a result, the UE 100*a* performs MBS reception in the first mode in the RRC connected state.

In Step S511, based on the switching information received from the gNB 200 in Step S509, the UE 100*b* performs, together with the gNB 200, connection processing (random access procedure) for establishing or recovering RRC connection with the gNB 200. As a result, the UE 100*b* performs MBS reception in the first mode in the RRC connected state.

OTHER EMBODIMENTS

In the operation examples described above, examples of switching from PTM of the first mode to PTM of the second mode have been mainly described. However, PTP of the first mode may be switched to PTM of the second mode. Since the first mode mainly targets the RRC connected state and which of PTP and PTM is selected depends on the implementation of the gNB 200, PTP of the first mode may be switched to PTM of the second mode. In this case, the UE 100 receives the MBS traffic transmitted through PTP from the gNB 200 in the first mode and receives the MBS traffic transmitted through PTM from the gNB 200 in the second mode. The switching from the first mode to the second mode includes switching from PTP to PTM.

Each operation example described above can be implemented not only separately and independently, but also in combination of some steps of two or more of the operation examples.

In the embodiments described above, an example in which the base station is an NR base station (gNB) is described; however, the base station may be an LTE base station (eNB). The base station may be a relay node such as an Integrated Access and Backhaul (IAB) node. The base station may be a Distributed Unit (DU) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

Supplementary Note
Introduction
Revised work items have been approved that are related to NR multicast broadcast services (MBS). It has been agreed that two delivery modes of the MBS are to be introduced as follows.

In Rel-17, R2 defines the following two modes.
1: Delivery mode for high QoS (reliability, delay) requirements available in the connected state (the UE can be switched to another state when no data reception is present, but this is not determined yet).

2: Delivery mode for "low" QoS requirements. The UE can also receive data in the inactive/idle state (details are not determined yet).

R2 assumes that Delivery mode 1 is only used for multicast sessions (in the case of R17).

R2 assumes that Delivery mode 2 is used for broadcast sessions.

The applicability of Delivery mode 2 to multicast sessions needs further study.

No data: When no ongoing data in a multicast session is present, the UE can remain in the RRC connected state. Further study is needed in the other cases.

For Delivery mode 2, an overview of the MBS configuration has been additionally agreed upon as follows.

The UE receives the MBS configuration (in the case of broadcast/Delivery mode 2) through the BCCH and/or MCCH (not yet determined), which can be received in the idle/inactive mode. Further study is needed for the connected mode. The notification mechanism is used to notify a change in the MBS control information.

In this supplementary note, the control plane aspect of the NR MBS is considered in view of the LTE eMBMS mechanism and the latest RAN2 agreement.

Discussion

In accordance with the agreement of RAN2, the two delivery modes at this point are summarized in Table 1.

TABLE 1

|  | Delivery mode 1 | Delivery mode 2 |
| --- | --- | --- |
| Intended for | Multicast sessions (High QoS requirement) | Broadcast sessions Multicast sessions (FFS) (Low QoS requirement) |
| Data reception in | Connected IDLE/INACTIVE (TBD) | Connected IDLE/INACTIVE |
| Configuration reception in | | Connected (FFS) IDLE/INACTIVE |
| Configuration signalling by | | BCCH MCCH (TBD) |
| Other | | A notification mechanism |

Delivery Mode 1 Configuration

Delivery mode 1 is mainly studied for data reception in an RRC connected state, but the configuration aspect thereof is not yet agreed upon. Although it may be very straightforward for an MBS configuration to be provided through RRC reconfiguration, receiving an MCCH in the connected state as in LTE eMBMS is still under study. Considering that Delivery mode 1 is expected for high QoS services, Delivery mode 1 may involve, for example, a PTP/PTM split bearer and/or lossless handover. Since there is no point to these UE-specific configurations when the configurations are provided through the MCCH, the RRC reconfiguration may be used for the configuration of Delivery mode 1 in our view.

Proposal 1: In Delivery mode 1, RAN2 should agree to use the RRC reconfiguration for the MBS configuration.

On the other hand, WID explicitly indicates that the RRC connected state and the RRC idle/inactive state should have maximum commonalities with respect to the MBS configuration as follows, but RAN2 has agreed upon separate delivery modes for multicast and broadcast sessions.

Changes are defined that are required to enable the UE in the RRC idle/inactive state to receive PTM transmission in order to maintain maximum commonalities between the RRC connected state and the RRC idle/inactive state for configuration of PTM reception.

Even when the RRC messages of these delivery modes are different, the structure and IE of the MBS configuration should be adjusted as much as possible between the two delivery modes to achieve the purpose of the WID. For example, the RRC reconfiguration of Delivery mode 1 includes information specific to Delivery mode 1 such as PTP/PTM split bearer and handover related information, in addition to MTCH scheduling information, which is a block common to Delivery mode 2. Details thereof need to be further studied.

Proposal 2: RAN2 should agree to aim for maximum commonalities between the two delivery modes from the viewpoint of the MBS configuration, for example, by using common structures and IEs.

Figure 20:
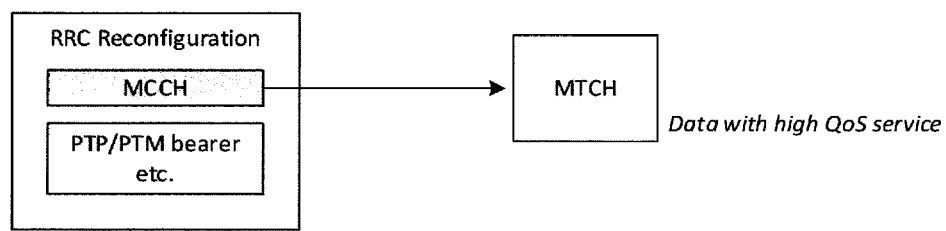
FIG. 20 is a diagram illustrating an example of a structure of a Delivery mode 1 configuration.

Note that the "MCCH" in FIG. 20 refers only to the MTCH scheduling information, i.e., the MTCH configuration associated with the MBS session information. In the case of Delivery mode 1, adjacent cell information is not necessary.

Whether the UE can be released to the idle/inactive state when there is no ongoing data for a multicast session needs further study. In other words, whether the UE in the idle/inactive state can receive the MBS data via Delivery mode 1 needs further study. As agreed upon by RAN2, the baseline is that the UE should remain in the RRC connected state for Delivery mode 1, that is, for multicast sessions requiring high QoS. However, other/exceptional cases are still worth studying.

During e-mail discussions, some companies have pointed out that a network may not be able to keep all of the UEs in the connected state due to congestion. Other companies have also pointed out that the UE does not need to always remain in the connected state for uplink activity, QoS requirements, and/or power consumption of the UE.

From the viewpoint of RAN2, it may be considered beneficial for both the network and the UE to support this functionality. It is assumed that whether/when the UE is released to be inactive depends on the implementation of the gNB and whether the UE is released to be idle depends on the core network. One concern with respect to MBS data reception in the idle state is that the gNB releases the UE context. On the other hand, the UE context is kept inactive. This means that the controllability of the gNB may be lost, which may be contradictory to the concept of general Delivery mode 1. RAN2 should agree that the UE can receive Delivery mode 1 at least in the inactive state, but further study is needed concerning the idle state.

Proposal 3: In Delivery mode 1, RAN2 should agree that the UE can receive Delivery mode 1 at least in the inactive state. Further study is needed concerning the idle state.

When Proposal 3 can be agreed upon, it is not clear how the idle/inactive MBS configuration is provided to the UE. There are three possible options.

Option 1: RRC Reconfiguration

The idle/inactive UE continues to employ the MBS configuration provided through the RRC reconfiguration. This option is simple because the UE only reuses the MBS configuration originally provided for the RRC connected state. However, when transitioning to the idle/inactive state and/or resuming the RRC connected state, some UE operations may need to be studied. For example, how to handle the PTP/PTM split bearer configuration when the configuration is performed.

Option 2: RRC Release

The idle/inactive UE employs the MBS configuration provided through the RRC release. This option is clear but may not be efficient, because it is doubtful whether the MBS configuration is different from the MBS configuration previously provided through the RRC reconfiguration.

Option 3: Switching of the Delivery Mode from Mode 1 to Mode 2

The UE is switched from Delivery mode 1 to Delivery mode 2 before being released to the idle/inactive state. This option is another simple solution since Delivery mode 2 is designed to be able to receive data in all the RRC states as agreed upon by the RAN2. However, it may be expected that packet loss and/or delay will occur during switching, for example, due to acquisition of the MCCH.

Each option has advantages and disadvantages, but in our opinion, Option 1 is slightly more desirable from the viewpoint of simplicity and efficiency. RAN2 should consider the above options but no such limitation is intended, and RAN2 also should discuss a method of providing the Delivery mode 1 configuration for data reception in the idle/inactive state.

Proposal 4: When Proposal 3 can be agreed upon, RAN2 should discuss how the Delivery mode 1 configuration for data reception in the inactive state is provided to the UE.

Delivery Mode 2 Configuration

In the LTE SC-PTM, configurations are provided through two messages, i.e., SIB 20 and SC-MCCH. The SIB 20 provides SC-MCCH scheduling information, and the SC-MCCH provides SC-MTCH scheduling information including the G-RNTI and the TMGI, and neighbor cell information.

Figure 21:
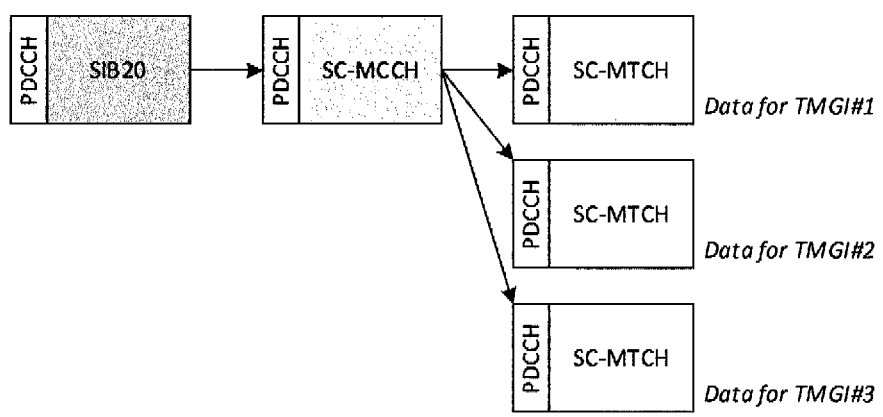
FIG. 21 is a diagram illustrating a two-stage configuration in LTE SC-PTM.

An advantage of the LTE two-stage configuration as illustrated in FIG. 21 is that the SC-MCCH scheduling is independent of the SIB 20 scheduling in terms of repetition period, duration, change period, and the like. The two-stage configuration facilitates frequent scheduling/update of the SC-MCCH, particularly for delay sensitive services and/or UEs that are delayed in participating in the session. According to the WID, one of the applications is group communication or the like, and is thus the same as, and/or similar, to the NR MBS.

Observation 1: In LTE, the two-stage configuration using the SIB 20 and the SC-MCCH is useful for different scheduling operations for these control channels. This is also useful for the NR MBS.

Proposal 5: RAN2 should agree on use of the two-stage configuration with different messages for the NR MBS, such as the SIB 20 and the SC-MCCH for the SC-PTM.

In addition to Proposal 5, the NR MBS is assumed to support various types of use cases described in the WID. It is appreciated that the NR MBS should be appropriately designed for a variety of requirements ranging from delay sensitive applications such as mission critical applications and V2X to delay tolerant applications such as IoT, in addition to the other aspects of requirements ranging from lossless application such as software delivery to UDP type streaming such as IPTV. Some of these services may be covered by Delivery mode 2, while other services with "high QoS requirements" require Delivery mode 1. In this sense, it is beneficial for the gNB to be able to choose use of Delivery mode 2 for multicast sessions.

It is also easy to allow the UE in the RRC connected state to receive the MBS configuration since RAN2 has already agreed to allow data reception in the RRC connected state. It is pointless for the UE having to transition to the idle/inactive state only to acquire the MCCH. Allowing the UE in the connected state to receive the MCCH is easy but may not be optimal in terms of flexibility in scheduling (since the UE may need a "gap") and/or power consumption of the UE (since the UE needs to monitor the "SC-RNTI" in addition to the C-RNTI and G-RNTI). Thus, whether the UE receives the MBS configuration through the MCCH or RRC reconfiguration may need to be discussed further.

These two challenges remain, but in general there seems to be no technical reason to limit them from our viewpoint.

Proposal 6: RAN2 should agree that Delivery mode 2 can be used for multicast sessions in addition to broadcast sessions.

Proposal 7: In Delivery mode 2, RAN2 should agree that the MBS configuration can also be received by the UE in the RRC connected state. Whether the MCCH or RRC reconfiguration is used needs further study.

The control channel in Delivery mode 2 should be designed in consideration of flexibility and the resource efficiency of the control channel in view of Proposal 6. Otherwise, for example, when one control channel includes a configuration of a delay tolerant service and a configuration of a delay sensitive service, the control channel needs to be frequently scheduled in order to satisfy delay requirements from the delay sensitive service. This may cause more signaling overheads.

An object A of the SA2 SI relates to enabling of general MBS services via 5GS, and specified use cases capable of benefiting from this function include (but are not limited to) public safety, mission critical applications, V2X applications, transparent IPv4/IPv6 multicast delivery, IPTV, wireless software delivery, group communications, and IoT applications.

Observation 2: The NR MBS control channel for Delivery mode 2 needs to be flexible and resource efficient with respect to various types of use cases.

As one possibility, as illustrated in FIG. 12, whether configuration channels need to be separated in different use cases is studied. For example, one MCCH frequently provides a delay sensitive service, and another MCCH infrequently provides a delay tolerant service. The LTE SC-PTM is limited in that one cell includes only one SC-MCCH. However, considering that more use cases are assumed than those of LTE, such limitation should be eliminated in the NR MBS in Delivery mode 2. When a plurality of MCCHs are allowed within the cell, each MCCH includes a scheduling configuration with a different repetition period which can be optimized for a specific service. How to identify the MCCH providing a service in which the UE takes interest needs further study.

Proposal 8: In Delivery mode 2, RAN2 should discuss whether a plurality of MCCHs are supported in the cell, which is not supported in LTE.

A new paradigm of NR is support for on-demand SI transmission. This concept may be reused for the MCCH in Delivery mode 2, i.e., on-demand MCCH. For example, the MCCH for delay tolerant services is provided on demand, thus enabling resource consumption for signaling to be optimized. Naturally, the network includes another option for providing the MCCH for delay sensitive services periodically, i.e., not based on a demand.

Proposal 9: Regarding Delivery mode 2, RAN2 should discuss an option when the MCCH is provided on demand, which is not supported by LTE.

As another possibility, as illustrated in FIG. 12, merging the above-described messages, i.e., one-stage configuration, may be studied further. For example, the SIB provides MTCH scheduling information directly, i.e., without the MCCH. This will provide optimization for delay tolerant services and/or power sensitive UEs. For example, the UE may request the SIB (on demand), and the gNB may start providing the SIB and the corresponding service after requests from a plurality of UEs. These UEs do not need to monitor the repeatedly broadcast MCCH.

Proposal 10: Regarding Delivery mode 2, RAN2 should discuss options such as direct provision of the MTCH scheduling information in the SIB when multicast reception with no use of the MCCH (i.e., one-stage configuration) is supported.

Interest Indication/Counting In LTE eMBMS, in order for the network to perform appropriate determination of MBMS data delivery including start/stop of MBMS sessions, two types of methods of collecting a UE reception/interest service are specified, i.e., MBMS interest indication (MII) and MBMS counting. MII triggered by the UE includes information related to an MBMS frequency of interest, an MBMS service of interest, an MBMS priority, and MBMS reception-only mode (ROM). A counting response triggered by the network via a counting request for a specific MBMS service includes information related to an MBSFN area and an MBMS service of interest.

These methods were introduced for various purposes. MII is mainly used by the network in order to ensure that the UE can continuously receive a service that the UE is interested in while being in the connected state. In contrast, counting is used to enable the network to determine whether a sufficient number of UEs are interested in receiving a service.

Observation 3: In LTE e MBMS, two types of UE assistance information are introduced for different purposes. In other words, MBMS interest indication is introduced for scheduling of NB, and MBMS counting is introduced for session control of MCE.

In a case of NR MBS, multicast services for use cases of group communication and the like are expected, and the network already has full knowledge related to the MBS service that the UE in the connected state is receiving/interested in, and thus assistance information from the UE, such as the network's determination regarding PTP/PTM delivery, is useless to the network. However, our understanding is that the same does not apply to broadcast services and/or the UEs in the idle/inactive state. In a case of broadcast services in particular, NR MBS still has the problem solved by MII and counting in LTE eMBMS, i.e., Observation 3. Thus, in RAN2, whether the assistance information, such as MII and counting, is useful for NR MBS needs to be studied.

As described in WID, since ROM and SFN are not supported in Rel-17, it is noted that MBMS ROM information of MII and information related to the MBSFN area of the counting response are not necessary.

Proposal 11: In RAN2, for example, introduction of the UE assistance information of NR MBS, such as MBS interest indication and/or MBS counting, needs to be agreed upon.

When Proposal 11 can be agreed upon, it is worthwhile to carry out a study on extended functions, in addition to LTE eMBMS. In LTE eMBMS, even when most of the UEs receive broadcast services in the RRC idle state, information of neither MII nor counting can be collected from the UEs in the idle state. To our understanding, this is one remaining problem that LTE eMBMS has from the viewpoint of session control and resource efficiency.

In NR MBS, the same problem may be present in the UEs in the idle/inactive state. For example, the network cannot know whether the UEs in the idle/inactive state are receiving/interested in broadcast services. Thus, the network may continue to provide PTM transmission even when there are no UEs being served. If the gNB recognizes interest of the UEs in the idle/inactive state, such unnecessary PTM should be avoided. Conversely, if PTM stops while UEs in the idle/inactive state receiving services are still present, many UEs may simultaneously request connection. This is also undesirable.

Accordingly, it is worthwhile to study whether to introduce a mechanism for collecting the UE assistance information, specifically MBMS counting, from the UE in the idle/inactive state. Needless to say, it is desirable that the UEs in the idle/inactive state be capable of reporting information without transitioning to RRC connected. For example, PRACH resource partitioning associated with the MBS service may be achieved when being introduced to such a report.

Proposal 12: In RAN2, whether the UE assistance information such as MBS counting is also collected from the UE in the idle/inactive state needs to be studied.

The invention claimed is:

1. A communication control method used in a mobile communication system for providing a multicast broadcast service (MBS) from a base station to a user equipment, the communication control method comprising:
   transmitting, by the base station to the user equipment, an MBS configuration through dedicated signaling;
   transmitting, by the base station to the user equipment in a Radio Resource Control (RRC) connected state, information notifying the user equipment to receive an MBS configuration through a multicast control channel; and
   receiving, by the user equipment having received the configuration information, the MBS configuration through the multicast control channel, wherein
   the MBS configuration transmitted through the dedicated signaling includes scheduling information of an MBS traffic channel for a MBS multicast session, and
   the MBS configuration transmitted through the multicast control channel includes the scheduling information of the MBS traffic channel for the same MBS multicast session.

2. A user equipment used in a mobile communication system for providing a multicast broadcast service (MBS), the user equipment comprising:
   a receiver configured to receive, from a base station, an MBS configuration transmitted through dedicated signaling, wherein
   the receiver is configured to receive from the base station, when the user equipment is in a Radio Resource Control (RRC) connected state, information notifying the user equipment to receive an MBS configuration transmitted through a multicast control channel, wherein
   the MBS configuration transmitted through the dedicated signaling includes scheduling information of an MBS traffic channel for a MBS multicast session, and
   the MBS configuration transmitted through the multicast control channel includes the scheduling information of the MBS traffic channel for the same MBS multicast session.

3. A chipset for a user equipment used in a mobile communication system for providing a multicast broadcast service (MBS), the chipset configured to execute processes of:
   receiving from a base station, an MBS configuration transmitted through dedicated signaling; and
   receiving from the base station, when the user equipment is in a Radio Resource Control (RRC) connected state, information notifying the user equipment to receive an MBS configuration transmitted through a multicast control channel, wherein the MBS configuration transmitted through the dedicated signaling includes scheduling information of an MBS traffic channel for a MBS multicast session, and the MBS configuration transmitted through the multicast control channel includes the scheduling information of the MBS traffic channel for the same MBS multicast session.

* * * * *